US012736208B2

(12) United States Patent
Archer et al.

(10) Patent No.: US 12,736,208 B2
(45) Date of Patent: Sep. 15, 2026

(54) TUNABLE COLOR LIGHT ENGINE HAVING MODULAR AND INTERCHANGEABLE DESIGN

(71) Applicant: ERP POWER, LLC, Westlake Village, CA (US)

(72) Inventors: Michael Archer, Moorpark, CA (US); Louis Chen, Simi Valley, CA (US); James H. Mohan, Valencia, CA (US); Steven C. Krattiger, Northridge, CA (US); Erik Morales, Los Angeles, CA (US); Vachik Javadian, Glendale, CA (US); Yuko Nakazawa, Santa Cruz, CA (US)

(73) Assignee: ERP POWER, LLC, Westlake Village, CA (US)

( * ) Notice: Subject to any disclaimer, the term of this patent is extended or adjusted under 35 U.S.C. 154(b) by 0 days.

(21) Appl. No.: 18/934,026

(22) Filed: Oct. 31, 2024

(65) Prior Publication Data

US 2025/0137631 A1 May 1, 2025

Related U.S. Application Data

(60) Provisional application No. 63/594,935, filed on Oct. 31, 2023, provisional application No. 63/594,937, (Continued)

(51) Int. Cl.

*F21V 23/00* (2015.01)
*F21V 7/00* (2006.01)
(Continued)

(52) U.S. Cl.

CPC .......... *F21V 23/005* (2013.01); *F21V 7/0091* (2013.01); *F21V 17/06* (2013.01); (Continued)

(58) Field of Classification Search

CPC ...... F21V 23/005; F21V 7/0091; F21V 17/06; F21V 23/008; F21V 23/009; F21V 23/06; (Continued)

(56) References Cited

U.S. PATENT DOCUMENTS 6,657,381 B1 12/2003 Arutaki
6,819,506 B1 11/2004 Taylor
(Continued)

FOREIGN PATENT DOCUMENTS

CN 207852672 U 9/2018
EP 2557905 A1 2/2013
(Continued)

OTHER PUBLICATIONS

International Search Report issued in corresponding application No. PCT/US2024/054015, dated Feb. 18, 2025, 3 pages.
(Continued)

*Primary Examiner* — Evan P Dzierzynski
(74) *Attorney, Agent, or Firm* — Womble Bond Dickinson (US) LLP

(57) ABSTRACT

A lighting system includes a power supply configured to receive an AC input signal and to generate a rectified signal; a light driver configured to generate a drive signal to drive a light source based on the rectified signal; and a housing configured to encapsulate the power supply and the light driver, the housing including a heatsink base forming a bottom portion of the housing and a case cover forming a top portion of the housing, the heatsink base being configured to channel heat away from the lighting system, the heatsink base including a base plate; and a pedestal structure protruding from the base plate toward the case cover.

15 Claims, 26 Drawing Sheets

Related U.S. Application Data filed on Oct. 31, 2023, provisional application No. 63/594,940, filed on Oct. 31, 2023.

(51) Int. Cl.

| | |
|---|---|
| ***F21V 17/06*** | (2006.01) |
| ***F21V 23/06*** | (2006.01) |
| ***F21V 29/70*** | (2015.01) |
| *H05B 45/10* | (2020.01) |
| *H05B 45/14* | (2020.01) |
| *H05B 45/24* | (2020.01) |
| *H05B 45/375* | (2020.01) |
| *H05B 47/165* | (2020.01) |

(52) U.S. Cl.
CPC .......... *F21V 23/008* (2013.01); *F21V 23/009* (2013.01); *F21V 23/06* (2013.01); *F21V 29/70* (2015.01); *H05B 45/10* (2020.01); *H05B 45/14* (2020.01); *H05B 45/24* (2020.01); *H05B 45/375* (2020.01); *H05B 47/165* (2020.01)

(58) Field of Classification Search
CPC ..... F21V 29/70; F21V 23/0435; H05B 45/10; H05B 45/14; H05B 45/24; H05B 45/375; H05B 47/165; H05B 45/20; H05B 47/19; H05B 45/30; F21Y 2115/10
See application file for complete search history.

(56) References Cited

U.S. PATENT DOCUMENTS

| | | | | |
|---|---|---|---|---|
| 8,123,381 | B1 | 2/2012 | Wray | |
| 8,894,254 | B2 | 11/2014 | Matsuda et al. | |
| 9,237,621 | B1 | 1/2016 | Xiong | |
| 9,258,895 | B1 | 2/2016 | Tate | |
| 9,429,306 | B2 | 8/2016 | Liu | |
| 10,426,003 | B2 | 9/2019 | Jiang et al. | |
| 10,584,862 | B2 | 3/2020 | Kim et al. | |
| 10,652,962 | B1 | 5/2020 | Qiu | |
| 10,982,829 | B2 | 4/2021 | Danesh | |
| 11,435,064 | B1 * | 9/2022 | Danesh | F21V 21/04 |
| 11,864,281 | B2 | 1/2024 | Archer et al. | |
| 12,127,312 | B2 | 10/2024 | Archer et al. | |
| 2003/0117087 | A1 | 6/2003 | Barth et al. | |
| 2006/0022214 | A1 | 2/2006 | Morgan | |
| 2008/0291360 | A1 | 11/2008 | Pei | |
| 2009/0080189 | A1 | 3/2009 | Wegner | |
| 2010/0026208 | A1 | 2/2010 | Shteynberg | |
| 2010/0046224 | A1 | 2/2010 | Lin | |
| 2010/0053950 | A1 | 3/2010 | Higuchi et al. | |
| 2010/0097811 | A1 | 4/2010 | Betsuda | |
| 2011/0063849 | A1 | 3/2011 | Alexander | |
| 2011/0110095 | A1 | 5/2011 | Li et al. | |
| 2011/0285292 | A1 | 11/2011 | Mollnow et al. | |
| 2011/0309760 | A1 | 12/2011 | Beland et al. | |
| 2012/0043560 | A1 | 2/2012 | Wu et al. | |
| 2012/0140442 | A1 * | 6/2012 | Woo | F21V 23/006 29/829 |
| 2013/0128578 | A1 | 5/2013 | Yu et al. | |
| 2013/0271997 | A1 | 10/2013 | Kim et al. | |
| 2014/0085829 | A1 | 3/2014 | Yamashita | |
| 2014/0097761 | A1 | 4/2014 | Chen et al. | |
| 2014/0103794 | A1 | 4/2014 | Ueda et al. | |
| 2014/0153250 | A1 | 6/2014 | Matsushita et al. | |
| 2014/0204562 | A1 | 7/2014 | Mori et al. | |
| 2014/0247598 | A1 | 9/2014 | Song et al. | |
| 2014/0300274 | A1 | 10/2014 | Acatrinei | |
| 2014/0362568 | A1 | 12/2014 | Su et al. | |
| 2015/0252972 | A1 | 9/2015 | Jiang | |
| 2015/0282260 | A1 * | 10/2015 | Hussell | F21V 29/70 438/23 |
| 2015/0351174 | A1 | 12/2015 | Chen et al. | |
| 2015/0382417 | A1 | 12/2015 | Chou et al. | |
| 2016/0018078 | A1 | 1/2016 | Katoh et al. | |
| 2016/0161099 | A1 | 6/2016 | Kim et al. | |
| 2017/0159891 | A1 | 6/2017 | Yanwei | |
| 2017/0196060 | A1 | 7/2017 | Watanabe et al. | |
| 2018/0356717 | A1 | 12/2018 | Cho | |
| 2019/0032859 | A1 | 1/2019 | Novak | |
| 2019/0041046 | A1 | 2/2019 | Sun et al. | |
| 2019/0049080 | A1 | 2/2019 | Danesh | |
| 2019/0101277 | A1 | 4/2019 | Kim | |
| 2019/0195479 | A1 * | 6/2019 | Bonne | F21V 23/004 |
| 2019/0230756 | A1 | 7/2019 | Jiang et al. | |
| 2020/0214097 | A1 * | 7/2020 | Qiu | H05B 45/24 |
| 2020/0363042 | A1 * | 11/2020 | Jeswani | F21S 8/026 |
| 2020/0393112 | A1 | 12/2020 | Portinga et al. | |
| 2020/0413513 | A1 | 12/2020 | Mohan et al. | |
| 2020/0413514 | A1 | 12/2020 | Qiu | |
| 2021/0018148 | A1 | 1/2021 | Yanwei | |
| 2022/0086984 | A1 | 3/2022 | Archer et al. | |
| 2022/0095430 | A1 | 3/2022 | Archer et al. | |
| 2022/0252244 | A1 | 8/2022 | Erdener et al. | |
| 2022/0364716 | A1 | 11/2022 | Hawkins | |
| 2023/0012403 | A1 | 1/2023 | Archer et al. | |
| 2023/0083227 | A1 | 3/2023 | Archer et al. | |
| 2024/0302031 | A1 | 9/2024 | Archer et al. | |
| 2024/0314903 | A1 | 9/2024 | Archer et al. | |

FOREIGN PATENT DOCUMENTS

| | | | |
|---|---|---|---|
| EP | 2650609 | A1 | 10/2013 |
| EP | 2 624 663 | B1 | 5/2015 |
| EP | 3736489 | B1 | 5/2022 |
| KR | 10-1911762 | B1 | 10/2018 |
| KR | 10-2471945 | B1 | 12/2022 |
| WO | WO 2013/022283 | A2 | 2/2013 |
| WO | WO 2024/187043 | A1 | 9/2024 |
| WO | WO 2025/096864 | A1 | 5/2025 |
| WO | WO 2025/096866 | A1 | 5/2025 |

OTHER PUBLICATIONS

International Written Opinion issued in corresponding application No. PCT/US2024/054015, dated Feb. 18, 2025, 5 pages.

International Search Report issued in corresponding application No. PCT/US2024/054014, dated Feb. 24, 2025, 3 pages.

Written Opinion issued in corresponding application No. PCT/US2024/054014, dated Feb. 24, 2025, 5 pages.

International Search Report issued in corresponding application No. PCT/US2024/054016, Feb. 14, 2025, 3 pages.

International Written Opinion issued in corresponding application No. PCT/US2024/054016, Feb. 14, 2025, 4 pages.

International Search Report and Written Opinion issued in corresponding International Application No. PCT/US24/18956, issued Jul. 30, 2024, 17 pages.

* cited by examiner

TUNABLE COLOR LIGHT ENGINE HAVING MODULAR AND INTERCHANGEABLE DESIGN

CROSS-REFERENCE TO RELATED APPLICATION(S)

This application claims priority to, and the benefit of, U.S. Provisional Application No. 63/594,935 ("TUNABLE COLOR LIGHT ENGINE HAVING MODULAR AND INTERCHANGEABLE DESIGN"), filed on Oct. 31, 2023; U.S. Provisional Application No. 63/594,937 ("WHITE COLOR LIGHT ENGINE HAVING MODULAR AND INTERCHANGEABLE DESIGN"), filed on Oct. 31, 2023; and U.S. Provisional Application No. 63/594,940 ("ADJUSTABLE WHITE LIGHT ENGINE HAVING MODULAR AND INTERCHANGEABLE"), filed on Oct. 31, 2023, the entire contents of which are incorporated herein by reference.

FIELD

Aspects of the present invention are related to light drivers.

BACKGROUND

A light emitting diode (LED) is an electronic device that converts electrical energy (commonly in the form of electrical current) into light. The light intensity of an LED is primarily based on the magnitude of the driving current. An LED light source may simulate a desired color by optically mixing light from different color LEDs, and controlling their drive currents in a manner such that the light combination produces the desired color. In the related art, the drivers, the power supply circuits that convert wall AC to DC voltages usable by the drivers, and the LED light sources are in separate device housings and are electrically connected to one another through electrical cables. This is done to avoid the many challenges that one would face in combining these disparate components into a single tight package. For example, combining a high-voltage power supply and a noise-generating light driver in a single compact package presents significant challenges surrounding powerline quality, noise, and electromagnetic interference (EMI), which are difficult to overcome. Further, LEDs can generate a great deal of heat, which can deteriorate the performance of the LEDs and other nearby components, if thermal dissipation is not managed properly.

However, using disparate components may make such lighting systems unsuitable for applications having tight spatial constraints.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to an adjustable white light engine having a modular and interchangeable design as described above.

Aspects of embodiments of the present invention are directed to a dimmable and/or tunable light engine with integrated power supply, color temperature mixing, wireless capabilities (e.g., to enable wireless dimming and color mixing), and an integrated light source (e.g., an integrated light array, such as an LED array) in a single, compact, multilayer housing. Thus, the light engine receives an AC signal from the wall through two wires and produces the desired light temperature and intensity, while maintaining all components necessary to convert the AC signal to the desired light output in a single self-contained compact package that is able to fit into existing fixtures, which are traditionally designed to fit only a light driver and/or a light array, and not a power supply.

In some embodiments, the light array is positioned on a conductive central pedestal that is on or integrated with a conductive base plate that simultaneously acts as a safety ground for the light engine and a heatsink for efficiently dissipating heat generated by the light array and other components. Other electrical circuit components are mounted to one or both sides of one or more layers that surround or on the central pedestal and thus have a thermal path to the conductive base plate. Further, the light engine utilizes integrated EMI filters, the vertical separation of circuit-mounted PCB layers, the strategic grouping of electronic components, and placement of insulators to suppress noise and mitigate or eliminate the adverse effect of high-energy electrical surges on the input AC lines.

According to some embodiments of the present disclosure, there is provided a lighting system including: a power supply configured to receive an AC input signal and to generate a rectified signal; a light driver configured to generate a drive signal to drive a light source based on the rectified signal; and a housing configured to encapsulate the power supply and the light driver, the housing including a heatsink base forming a bottom portion of the housing and a case cover forming a top portion of the housing, the heatsink base being configured to channel heat away from the lighting system, the heatsink base including: a base plate; and a pedestal structure protruding from the base plate toward the case cover.

In some embodiments, the heatsink base further includes: a base post configured to couple the base plate and the case cover; and base sidewalls extending from the base plate and configured to mate with cover sidewalls of the case cover.

In some embodiments, the lighting system further includes: a first layer vertically offset from the heatsink base by a base post of the heatsink base, the first layer including a first printed circuit board (PCB) and having a first layer opening, wherein the pedestal structure passes through the first layer opening, and wherein one of more components of at least one of the power supply or the light driver are mounted on at least a top side of the first layer facing away from the base plate.

In some embodiments, the lighting system further includes: a second layer on the pedestal structure and vertically offset from the first layer by the base post, the second layer including a second printed circuit board (PCB), wherein the first and second layers overlap one another in a plan view, and wherein one of more components of at least one of the power supply or the light driver are mounted on at least a top side of the second layer facing away from the first layer.

In some embodiments, components mounted on the second layer are electrically connected to components mounted on the first layer via an electrical connector.

In some embodiments, the lighting system further includes: a second layer on the pedestal structure and including a second printed circuit board (PCB), wherein one of more components of at least one of the power supply or the light driver are mounted on at least a top side of the second layer facing away from the base plate of the heatsink base.

In some embodiments, the lighting system further includes: the light source that is configured to emit light based on the drive signal, wherein the light source is mounted on the second layer in a position corresponding to the pedestal structure, and is thermally coupled to the pedestal structure.

In some embodiments, the lighting system further includes: a third layer on the second layer and partially overlapping the second layer in a plan view, wherein the third layer contacts a top surface of the second layer.

In some embodiments, the second and third layers have overlapping openings to accommodate passage of a base post of the heatsink base therethrough.

In some embodiments, components mounted on the third layer are electrically connected to components mounted on the second layer via a plurality of reflow connections at an interior edges of third layer that connect to corresponding electrical pads on the second layer.

In some embodiments, the light driver includes: a channel controller mounted on a top side of the third layer facing away from the heatsink base and configured to control regulation of light output of the light source; and an antenna electrically coupled to the channel controller and mounted to the third layer, at least a portion of the antenna extending along an outer edge of the third layer.

In some embodiments, one or more components of the light driver are mounted on an under side of the third layer in a position overlapping the channel controller, and the second layer has an opening corresponding to a location of the channel controller on the third layer to permit placement of the one or more components of the light driver that are mounted under the channel controller.

In some embodiments, a light output of the light source has an intensity of 2000 lumens or less and a CCT of 1300K to 8000K, and the housing has a substantially cylindrical shape with a diameter of 50 mm to 65 mm or less.

In some embodiments, the housing has an opening through which light from the light source passes through to reach the outside, the housing has an outer diameter of 50 mm, and the opening has an inner diameter of 9 mm to 12 mm, and the light source includes 3-channel desaturated light emitting diodes (LEDs) and is configured to generate a light of 1300 lm with a CCT from 2200K to 5000K.

In some embodiments, the housing has an opening through which light from the light source passes through to reach the outside, the housing has an outer diameter of 50 mm, and the opening has an inner diameter of 19 mm, and the light source includes 3-channel desaturated light emitting diodes (LEDs) and is configured to generate a light of 1400 lm with a CCT from 2700K to 4000K.

In some embodiments, the housing has an opening through which light from the light source passes through to reach the outside, the housing has an outer diameter of 50 mm, and the opening has an inner diameter of 9 mm to 12 mm, and the light source includes 3-channel desaturated light emitting diodes (LEDs) and is configured to generate a light of 1400 lm with a CCT from 2700K to 4000K.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a compact, integrated multi-layered lighting system, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the present disclosure are directed to an integrated multi-layered lighting system in a single fixture with wireless capabilities, color temperature mixing, and an integrated light source, which does not sacrifice functionality in favor of space. In some embodiments, this integrated lighting system is multilayered with multiple printed circuit board (PCB) layers that provide additional surface area for mounted components. The resulting lighting system may mimic the color temperature of an ideal black body radiator while being able to fit color channels, a microprocessor, power electronic circuitry, and control circuitry onto a multilayered PCB design that remains compact and is able to fit into existing fixtures. In some examples, the integrated lighting system has a very compact design with a diameter of 61 mm or less and a height of 30 mm or less. The integrated lighting system may operate under a wide input range of about 90 VAC to about 305 VAC at a frequency of about 50-60 Hz. With such input, the integrated lighting system may be capable of delivering up to 5000 lumens at various CCT settings.

According to some embodiments, the compact, multilayer design of the lighting system maximizes the amount of space for installing through-hole components.

Figure 1:
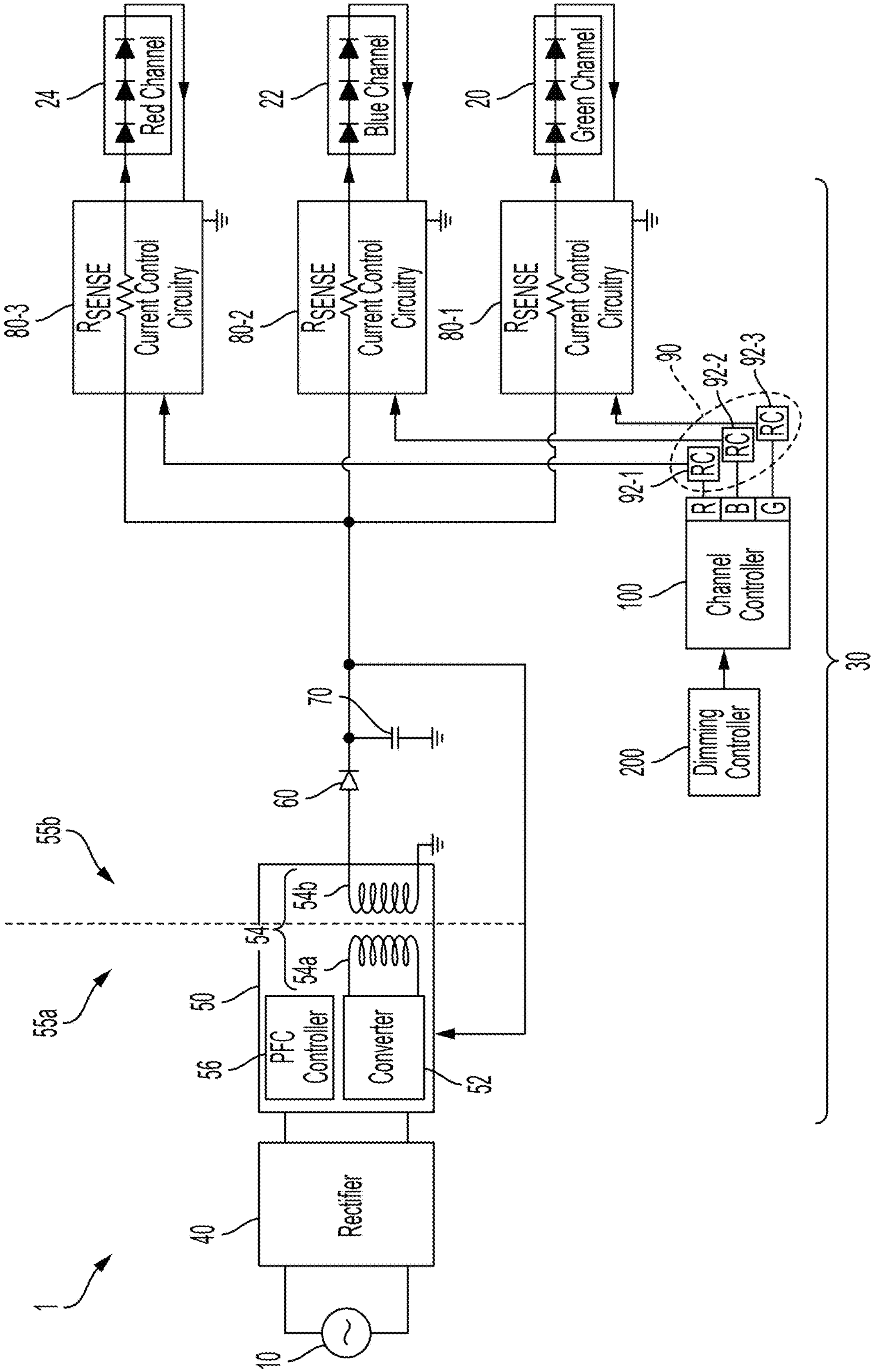
FIG. 1 illustrates a lighting system including a multi-channel light driver, according to some example embodiments of the present disclosure.

FIG. 1 illustrates a lighting system 1 including a multi-channel light driver 30, according to some example embodiments of the present disclosure.

According to some embodiments, the lighting system 1 includes an input source 10, a plurality of color channels (e.g., a plurality of LED channels) 20, 22, and 24, and a multi-channel light driver 30 for powering and controlling the brightness/intensity of the color channels 20, 22, and 24.

The input source 10 may include an alternating current (AC) power source that may operate at a voltage of 100 Vac, a 120 Vac, a 240 Vac, 277 Vac, or higher, for example. The input source 10 may also include a dimmer electrically powered by said AC power sources. The dimmer may modify (e.g., cut/chop a portion of) the input AC signal according to a dimmer level before sending it to the light driver 30, and thus variably reduces the electrical power delivered to the light driver 30 and the color channels 20, 22, and 24. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like.

In some embodiments, the plurality of color channels includes a first channel (e.g., a green channel) 20, a second channel (e.g., a blue channel) 22, and a third channel (e.g., a red channel) 24. Each channel may include one or more light-emitting-diodes (LEDs) of the corresponding colors (e.g., red, green, or blue LEDs). While in some embodiments, the first through third color channels 22-24 represent RGB colors, embodiments of the present disclosure are not limited thereto, and the plurality of channels may include any suitable number of color channels. Further, embodiments, of the present disclosure are not limited to LEDs, and in some examples, other solid-state lighting devices may be employed.

In some embodiments, the multi-channel light driver 30 includes an input rectifier (e.g., an input rectifier circuit) 40, a power supply (also referred to as a power supply circuit) 50, an output rectifier 60, a filter 70, a plurality of current control circuits 80-1 to 80-3, and a channel controller 100.

The input rectifier 40 may provide a same polarity of output for either polarity of the AC signal from the input source 10. In some examples, the input rectifier 40 may include a full-wave circuit using a center-tapped transformer, a full-wave bridge circuit with four diodes, a half-wave bridge circuit, or a multi-phase rectifier. The input AC signal may be about 90 VAC to about 305 VAC at 50-60 Hz.

The power supply circuit 50 converts the rectified AC signal generated by the input rectifier 40 into a drive signal for powering the plurality of color channels 20, 22, and 24. In some embodiments, the power supply circuit 50 includes a voltage converter 52 for maintaining (or attempting to maintain) a constant DC bus voltage on its output while drawing a current that is in phase with and at the same frequency as the line voltage (by virtue of a PFC controller/circuit 56). A transformer 54 inside the power supply circuit 50 produces the desired output voltage from the DC bus. In some examples, the power supply circuit 50 may include the PFC circuit (or PFC controller) 56 for improving (e.g., increasing) the power factor of the load on the input source 10 and reducing the total harmonic distortions (THD) of the light driver 30.

According to some embodiments, the multi-channel light driver 30 drives the plurality of color channels 20, 22, and 24 to produces light temperatures that follow the blackbody curve. In so doing, the multi-channel light driver 30 may perform color mixing of, for example, red, blue, and green light to achieve the desired light temperature. In some embodiments, the multi-channel light driver 30 determines the color temperature based on a dimmer setting, a time of day, or a combination thereof.

In some embodiments, the driving current of each of the plurality of color channels 20, 22, and 24 may be derived from the same secondary winding 54*b* of the transformer 54. While the plurality of color channels 20, 22, and 24 are driven by the same winding, the channel current of each color channel is independent of the other color channels. This independent control of the channel currents is enabled by utilizing a separate/different current control circuit 80 for each color channel 20/22/24.

According to some embodiments, the color channels 20, 22, and 24 share a common output rectifier (e.g., diode) 60 and filter (e.g., capacitor) 70, which convert the AC driving signal output by the secondary winding 54*a* of the transformer 54 into a DC channel current for driving the color channels 20, 22, and 24. The anode of the output rectifier 60 may be connected (e.g., directly connected) to the output terminal of the power supply circuit 50.

According to some embodiments, each of the plurality of current control circuits 80-1 to 80-3 is configured to adjust the channel current of the corresponding color channel 20/22/24 based on the drive signal from the power supply circuit 50 and a corresponding filtered reference signal (e.g., a pulse width modulated (PWM) signal) from the channel controller 100 and the filter circuit 90. By controlling the color intensity (as measured by lumens, Lm) of each of the red, blue, and green colors output by the color channels 20, 22, and 24, the channel controller 100 may not only enable light dimming, but also adjusts the color mixing of the channels 20, 22, and 24 to replicate light temperatures (temperature in kelvins, K), which follow the black body curve. The channel controller 100 determines the color mix (e.g., the intensity of the red, blue, and green light colors) for each color temperature based on a lookup table that provides the light intensities of the different color channels. The tabulated color mix may accurately follow the black body curve.

The dimmer level may be determined based on a dimmer setting from a dimming controller 200, which may be in electrical communication with the channel controller 100, as shown in FIG. 1. However, embodiments of the present disclosure are not limited thereto. For example, the dimming controller 200 may also be a TRIAC or ELV dimmer at the input source 10. In some examples, the dimmer level at 100% may correspond to an output light intensity of about 5000 lumens.

Figure 2:
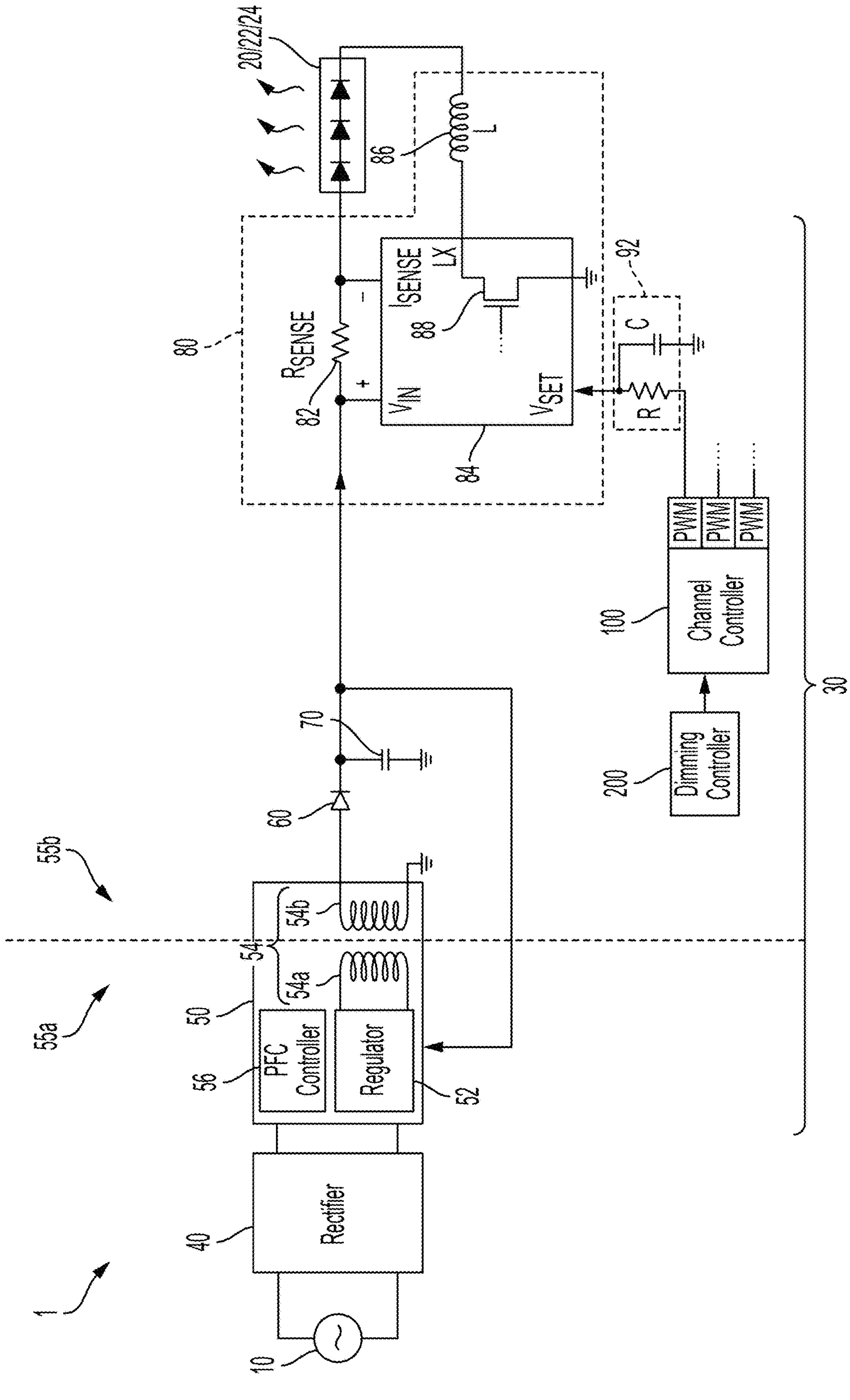
FIG. 2 illustrates a schematic diagram of a current control circuit of the multi-channel light driver, according to some embodiments of the present disclosure.

FIG. 2 illustrates a schematic diagram of a current control circuit 80 of the multi-channel light driver 30, according to some embodiments of the present disclosure.

Referring to FIG. 2, in some embodiments, the current control circuit 80 is electrically coupled to the secondary side 55*b* of the power supply circuit 50. The current control circuit 80 includes a sense resistor ($R_{SENSE}$) 82 that is coupled between the output of the power supply circuit 50 and the corresponding color channel 20/22/24 and is connected electrically in series with the corresponding color channel 20/22/24. The sense resistor 82 is configured to enable sensing of the channel current ($I_{CHANNEL}$) of the corresponding color channel 20/22/24.

In some embodiments, the current control circuit 80 also includes a regulator (also referred to as a buck regulator, a buck converter, or a step down converter) 84 configured to sense the output voltage of the power supply circuit 50 (e.g., at its $V_{IN}$ input), to sense the channel current via the sense resistor 82 (e.g., at its $I_{SENSE}$ input), to receive the reference signal (e.g., PWM signal) corresponding to the color channel 20/22/24 from the channel controller 100 (e.g., at its VSET input), and to regulate the channel current according to the sensed/received signals. The regulator 84 is configured to sense the current of the color channel 20/22/24 by measuring the voltage drop across the sense resistor 82 (via the $V_{IN}$ and the $I_{SENSE}$ inputs). In some embodiments, the channel current passing through the color channel 20/22/24 is routed back through the regulator 84 (via its LX input) to ground. The regulator 84 includes a switch (e.g., a metal oxide field effect transistor (MOSFET)) capable of switching the channel current on and off based on the sensed output voltage, the sensed channel current, and the reference signal. The current control circuit may also include an inductor 86 coupled between the color channel 20/22/24 and the regulator 84 and positioned in a current path of the channel current 20/22/24, which enables the regulator (e.g., the buck regulator) 84 to produce a regulated current. Thus, by controllably switching the channel current on and off, the regulator 84 may provide down-current regulation of the channel current.

According to some embodiments, to maintain accurate dimming down to 1% while reducing ripple in the channel current, a hybrid DC/PWM signal is applied to the regulator 84 to achieve the benefits of both DC and PWM dimming. In some embodiments, the hybrid DC/PWM signal is a pseudo-sawtooth waveform that is seen as an effective DC voltage when operating above the regulator's cutoff voltage (which may correspond to about 5% or higher dimming) and seen as a PWM signal after entering the cutoff region of operation of the regulator 84 (which may correspond to dimming below 5%).

According to some embodiments, to produce the pseudo-sawtooth signal, the channel controller 100 first generates the reference signal in the form of a PWM signal (e.g., a square PWM signal), which oscillates between two discrete values and has an adjustable/variable pulse width or duty cycle. The PWM signal is then filtered by a low pass filter 92 of the filter circuit 90 to produce the pseudo-sawtooth signal, which is a smoothly varying analog signal having a triangular or substantially triangular waveform. The low pass filter 92 may be a first order RC filter, as shown in FIG. 2; however, embodiments of the present application are not limited thereto, and the low pass filter 92 may be any suitable filter, such as a higher order filter or an RLC filter. Generating the pseudo-sawtooth waveform using a PWM signal and a filter obviates the need for a digital to analog converter (DAC) for each color channel, which would have increased the cost of the light driver.

The mode of operation of the regulator 84 is determined by the cutoff voltage associated with the VSET input, which causes the regulator 84 to shut off when the voltage at the VSET input drops below the cutoff voltage. While the voltage of the reference signal is above the cutoff voltage, the regulator 84 continuously adjust the channel current according to the effective DC value of the sawtooth signal at its VSET input. However, when the voltage of the sawtooth signal drops below the cutoff voltage, the regulator 84 is configured to turn off (e.g., disable the switch 88) thus shutting off the first channel current.

However, embodiments of the present disclosure are not limited to the output stage of the embodiments of FIGS. 1-2. For example, rather than use a regulator at the output stage, some embodiments of the present disclosure may utilize a voltage-controller resistor (VCR) to control the voltage supplied to the light channels.

Figure 3:
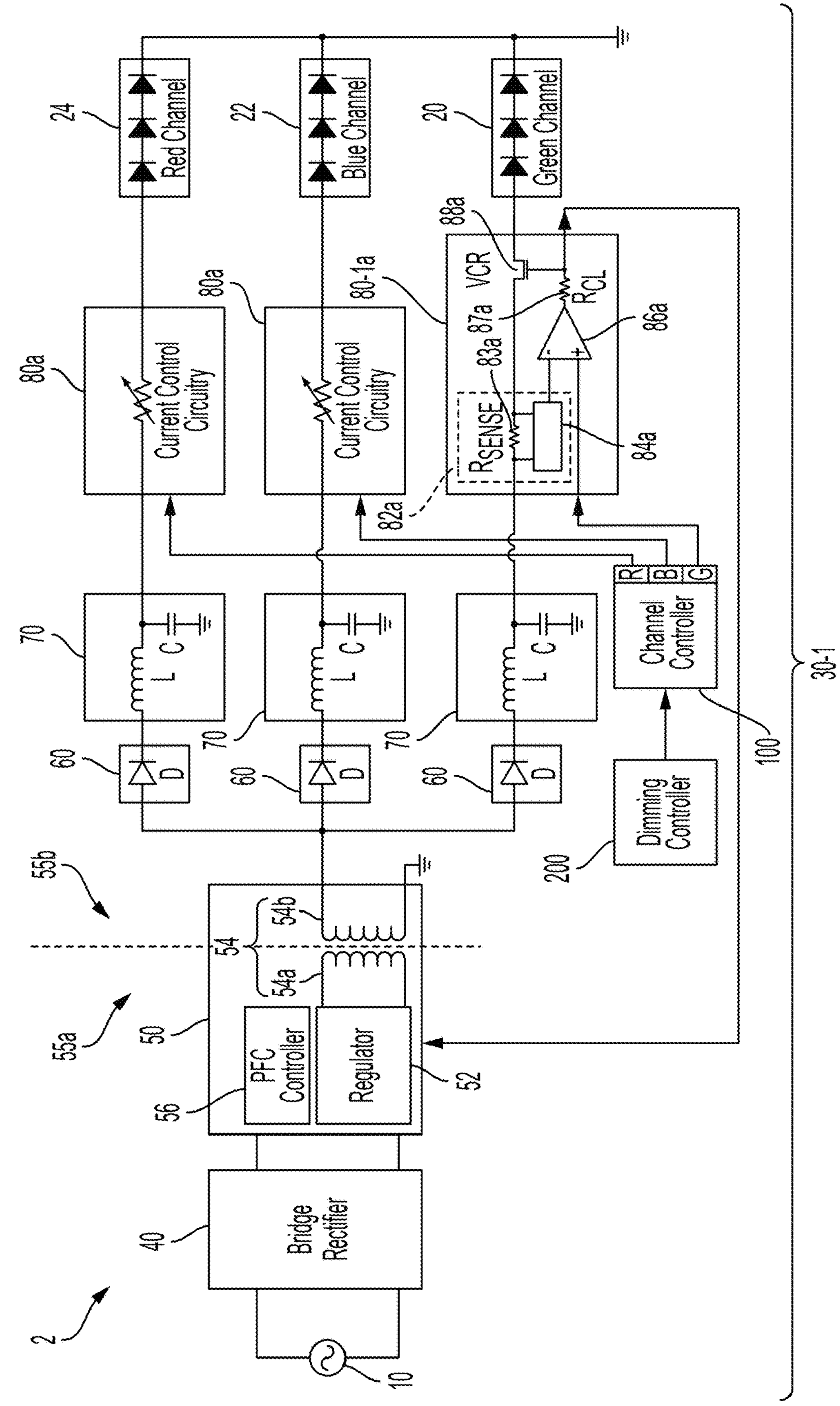
FIG. 3 illustrates a schematic diagram of a current control circuit utilizing a VCR, according to some embodiments of the present disclosure.

FIG. 3 illustrates a schematic diagram of a current control circuit 80*a* utilizing a VCR, according to some embodiments of the present disclosure.

Referring to FIG. 3, in some embodiments, the current control circuit 80*a* includes a current sensor 82*a* configured to sense a channel current ($I_{CHANNEL}$) of the corresponding color channel 20/22/24 and to generate a sense signal; an error amplifier (also referred to as a comparator) 86*a* configured to receive the sense signal from the current sensor 82*a* and the reference signal (VREF) from the channel controller 100, and to generate the feedback signal (also referred to as an error signal/gate control signal) based on a difference between the reference signal and the sense signal; and a voltage-controlled resistor (VCR, e.g., a linear pass element) 88*a* that is configured to adjust the corresponding channel current by dynamically adjusting a resistance of the VCR 88*a* based on the feedback signal from the error amplifier 86*a*.

In some embodiments, the current sensor 82 includes a sense resistor ($R_{SENSE}$) 83*a* that is coupled between the output of the power supply circuit 50 and the corresponding color channel 20/22/24 and is connected electrically in series with the corresponding color channel 20/22/24. The current sensor 82*a* also includes a current sense circuit 84*a* that is configured to sense a current of the color channel 20/22/24 by measuring the voltage drop across the sense resistor 83*a*, and to generate the sense signal that is provided to the error amplifier 86*a* (e.g., to the negative input terminal of the error amplifier 86*a*).

According to some embodiments, the VCR 88*a* is electrically connected in series with the sense resistor 83*a* and the color channel 20/22/24. In some embodiments, the VCR 88*a* is a field effect transistor (FET), such as a junction FET (JFET) or a metal-oxide-semiconductor FET (MOSFET) that operates in the quasi-saturation region (e.g., linear/ohmic region) and functions as a variable resistor, whose resistance is controlled by the gate voltage.

According to some embodiments, the feedback signal from the error amplifier 86*a* controls the resistance of the VCR 88*a* to regulate the channel current to a desired value, which corresponds to the reference signal. As the current control circuits 80*a* dynamically adjusts the resistance of the VCR 88*a* in response to the instantaneous changes in the channel current, the current control circuit 80*a* regulates the channel current to the desired level, as determined by the corresponding reference signal.

According to some embodiments, the channel controller 100 generates a reference signal for each of the plurality of color channels 20, 22, and 24 based on the desired color intensity of the channels. For example, when the color channels include a green color channel 20, a blue color channel 22, and a red color channel 24, the channel controller may generate a first reference signal corresponding to the desired green color intensity to send to the first current control circuit 80*a* associated with the green color channel 20; may generate a second reference signal corresponding to the desired blue color intensity to send to the second current control circuit 80*a* associated with the blue color channel 22; and may generate a third reference signal corresponding to the desired red color intensity to send to the third current control circuit 80*a* associated with the red color channel 24.

Referring to FIG. 3, in some embodiments, the power supply circuit 50 monitors the state of the VCR 88*a* of the current control circuit 80-1*a* and adjusts its output voltage (i.e., the output voltage of the secondary winding 54*b*) to reduce or minimize the voltage drop across the VCRs 88*a*. In some examples, current control circuit 80-1*a* corresponds to (e.g., is associated with) the green color channel 20.

In some examples, the feedback signal (also referred to as a correction signal) from the error amplifier 86*a* that controls the green color channel 20 is communicated to the power supply circuit. In some embodiments, the feedback signal is provided to the PFC controller circuit 56, which may perform power factor correction for the power supply circuit 50.

In some embodiments, when the error amplifier 86*a* of the current control circuit 80-1*a* determines to increase the drive current of the green color channel 20 (e.g., when increasing the intensity of the green light), the corresponding feedback signal, which is transmitted to the primary side 55*a*, notifies the power supply circuit 50-1 to increase its output voltage to ensure sufficient drive voltage for the green color channel 20 (and hence the blue and red color channels 22 and 24). Conversely, when the error amplifier 86*a* of the current control circuit 80-1*a* determines to decrease the drive current of the green color channel 20 (e.g., when reducing the intensity of the green light), the corresponding feedback signal notifies the power supply circuit 50-1 to decrease its output voltage to prevent excessive power dissipation by the VCRs 88*a*.

As such, by properly controlling the voltage headroom, the power supply circuit 50 may provide sufficient drive voltage and current to drive all of the independent color channels, while reducing or minimizing excess power dissipation by the VCRs. The multi-channel light driver 30-1 controls the headroom of all channels by using only a single feedback/control loop from one dominant color channel (e.g., the green color channel), rather than several different feedback loops. This greatly simplifies the control logic of the light driver 30-1, which translates to lower overall cost and size of the system.

According to some embodiments, the components of the light driver 1/2 are packaged within a multi-layered lighting system that has a multi-level printed circuit board (PCB) design that vertically stacks two or more PCB layers coupled by connectors/separators. The components of the lighting system 1/2 are mounted on the top side of the bottom PCB (e.g., main PCB) or on both the top and bottom sides of the remaining PCB board layers (e.g., daughter board layers). These layers may be added or removed in order to provide more space to mount all the components for the lighting system ½.

Figure 4:
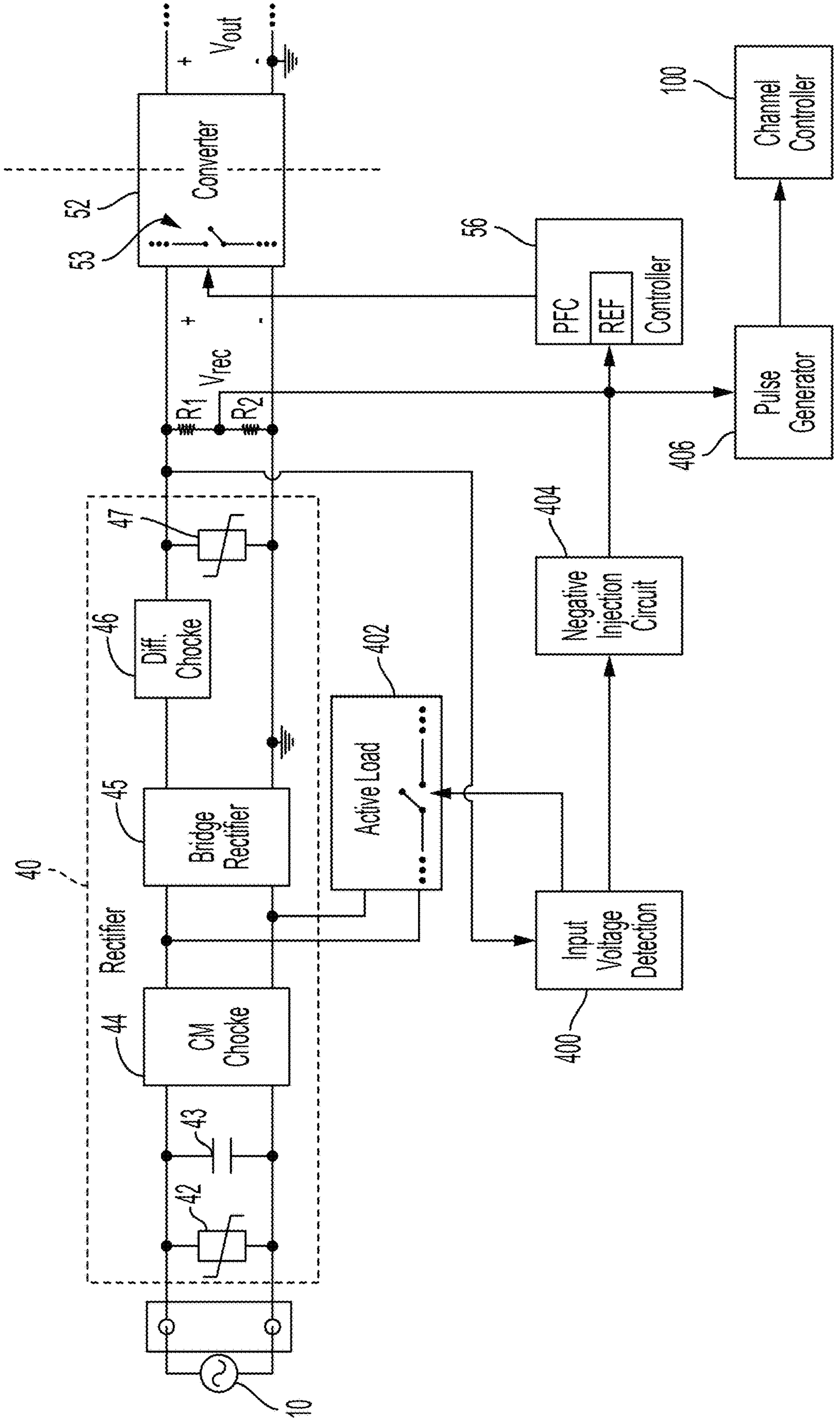
FIG. 4 illustrates a schematic diagram of the input stage of the lighting system, according to some embodiments of the present disclosure.

FIG. 4 illustrates a schematic diagram of the input stage of the lighting system 1, according to some embodiments of the present disclosure.

In some embodiments, the input rectifier 40 of the lighting system 1 includes a first metal oxide varistor (MOV) 42 and a capacitor (e.g., a bulk capacitor 43) coupled in parallel between the two input AC lines, a common-mode (CM) choke 44, a bridge rectifier 45, a differential choke 46, and a second MOV 47 coupled between the input lines to the converter 52.

The MOVs 43 and 47 may aid to suppress differential type spikes, which is where most of the energy of an energy surge is). An MOV may exhibit very high resistance (and essentially become an open circuit) when the input voltage is less than a threshold (e.g., 320 V), but exhibit very low resistance when the input voltage exceeds the threshold and effectively becomes a short circuit that returns the current back to the AC line and prevents the current from entering other parts of the lighting system circuit. As such, the MOV can suppress the massive current surge from a differential type lighting surge. While FIG. 4 illustrates MOVs on both sides of the bridge rectifier 45, embodiments of the present disclosure are not limited thereto, and the input rectifier may include only a single MOV on one side of the bridge rectifier 45. According to some examples, one or more of the MOVs 42 and 47 may be replaced with a transient voltage suppression diode (TVSD).

The CM choke 44 may suppress a common-mode electrical surge and may act as an EMI filter which substantially reduces or prevents fast transients from getting into or out of the lighting system 1. The CM choke 44 may be include two inductors (one on each AC line) that share the same core. The differential-mode choke 46 which may be on only one of the two input lines can aid to suppress differential-mode electrical surges.

According to some embodiments of the present disclosure, the input stage of the lighting system 1 includes an input voltage detector 400, an active load 402, a negative injection circuit 404, and a pulse generator 406.

The input voltage detector 400 that is configured to detect the voltage level of the haversine signal at the input of the converter 52. For example, the input voltage detector 400 may determine whether the input voltage is about 120 V or about 277 V or higher. When the detected voltage is about 120 V, the input voltage detector activates the active load 402 that is coupled to the input AC lines (e.g., between the CM choke 44 and the bridge rectifier 45). The active load 402 is primarily a resistive load that improves the performance of a TRIAC dimmer that may be coupled to the input of the lighting system 1. As TRIAC dimmers are not utilized at input voltages higher than 120 VAC, the input voltage detector 400 deactivates the active load 402 when the detected voltage is above 120 V.

Conversely, the input voltage detector 400 deactivates the negative injection circuit 404 when the input voltage is 120 V, and activates the negative injection circuit 404 when the input voltage is higher than 120 V (e.g., when it is 277 V or higher).

When sampling voltage for the reference pin of the PFC controller 56, it is desirable for the shape of the rectified input voltage $V_{REC}$ to be preserved as the inductor current of the converter 52 is limited by the sampled voltage which is fed to the reference pin REF of the PFC controller 56. According to some embodiments, the negative injection circuit 404, which is also electrically connected to the reference pin REF of the PFC controller 56, helps to preserve the voltage signal which enters the reference pin REF. This, in turn, allows the light driver 30 to maintain proper power factor and low total harmonic distortion (THD) of the input line current.

Without the negative injection circuit 404, an issue may arise when operating the light driver 30 at low loads where insufficient current is drawn by the load to fully discharge input filter capacitors that are incorporated in the converter 52 to hold the voltage up. The input filter capacitors serve to hold the voltage and it is desirable for them to be fully discharged prior to the next cycle of the rectified voltage.

According to some embodiments, the downshifting of the sampled rectified signal by the negative injection circuit 404 ensures that the light driver 30 is able to operate efficiently by keeping the inductor current of the converter 52 in-phase and at the same fundamental frequency as the sampled rectifier voltage, thus providing a high power factor and low THD.

Also, when the light driver 30 is operating at low output levels, the on time of the PFC controller may be lowered and high frequency switching at the converter 52 may increase. An increase in high frequency switching may induce more common mode noise that is observed entering the reference pin REF of the PFC controller 56. Because injecting a negative voltage to the reference pin REF to shift the sampled rectifier output voltage VREC ensures that the light driver 30 is able to operate efficiently (by keeping the inductor current of the converter 52 in phase and of the same fundamental frequency as the sampled rectifier voltage), high frequency switching at the converter 52 may decrease, which may result in less common mode noise.

As described above, the negative injection voltage-VDC supplied by the negative injection circuit 404 to the reference pin of the PFC controller 56 shifts the sampled rectifier signal downward in such a way that the signal entering the reference pin is that of a shifted haversine signal which has valleys that reach zero or close to zero (e.g., as close to zero as possible). Shifting the sampled haversine signal to reach zero or substantially zero ensures that high PF and low THD can be obtained. Without the valleys reaching near zero, the PFC controller 56 may not be able to properly maintain the inductor current in phase with, or of the same fundamental frequency as, the sampled voltage signal. The amount of negative voltage injected may be automatically adjusted by sensing the AC voltage and/or AC current that enters the drivers input. Further, the circuitry serves to reduce common mode noise that enters the multiplier pin.

In some embodiments, the pulse generator circuit 406 is coupled to the output of the rectifier 40 through a first voltage divider with first and second resistors R1 and R2 that attenuates the rectified input line voltage $V_{REC}$ to produce a rectified signal, which the pulse generator circuit 406 utilizes to generate a pulsed signal (e.g., a pulse-width-modulated (PWM) signal) that corresponds to the signal received by the rectifier 40, which may be a chopped waveform from a dimmer (e.g., a TRIAC dimmer or a 0-10V dimmer). Thus, the pulsed signal is indicative of the light dimming level (e.g., the dimming level set by a user via a phase-cut dimmer). As such, the pulse generator circuit 406 provides this signal to a PWM input of the channel controller 100 so that the controller 100 may determine the dimming level set by a user at the phase-cut dimmer and adjust the light output intensity of the light channels 20/22/24 accordingly.

Figure 6:
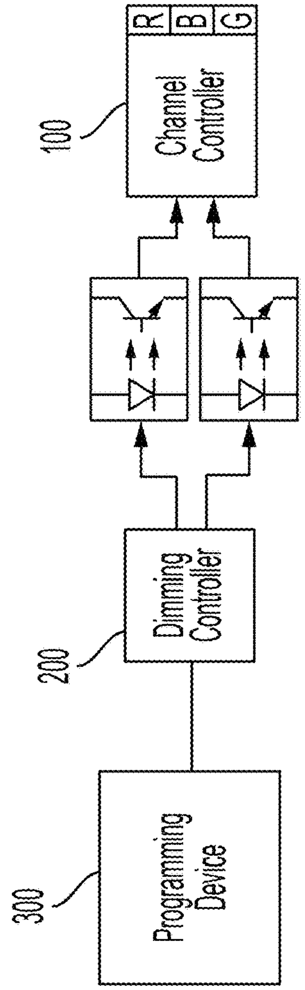
FIG. 6 illustrates the connection between the programming device, the dimming controller, and the channel controller of the lighting system, according to some embodiments of the present disclosure.
Figure 5:
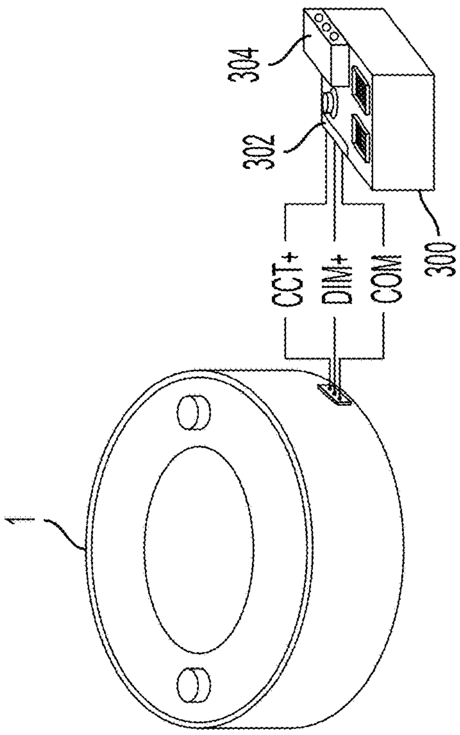
FIG. 5 illustrates a programming device of the lighting system, according to some embodiments of the present disclosure.

FIG. 5 illustrates a programming device 300 of the lighting system 1, according to some embodiments of the present disclosure. FIG. 6 illustrates the connection between the programming device 300, the dimming controller 200, and the channel controller 100 of the lighting system 1, according to some embodiments of the present disclosure.

Referring to FIGS. 5-6, in some embodiments, the CCT value and the dimming level of the lighting system 1 may be set or programmed in memory by a programing device 300 is capable of initiating programming mode of the lighting system 1. During normal operation, the lighting system 1 may rely on the programmed values to set/determine the CCT and/or dimming level of the output light. In some examples, the programming device 300 may connect to and interfacing with the dimming controller 200 of the programmable lighting system 1 via lead wires 302 or a block connector 304.

Because the lighting system 1 is a self-contained light engine whose only connection to the outside world is through the two AC input lines, and the lead wires/connector to the programming device 300, it is desirable to electrically isolate the dimming controller 200 from the rest of the circuit within the lighting system 1. As such, in some embodiments, the dimming controller communicates the programming values of the dimming level and CCT values to the channel controller 100 via one or more optocouplers. By maintaining this electrical isolation, the lighting system 1 may also satisfy the EMI requirements that are imposed on devices that connect directly to wall AC.

According to some embodiments, the compact lighting system 1 includes the power supply, which converts AC to DC, and the light source (e.g., LEDs) in one compact package having a round aperture. The lighting system 1 is fully configurable and can be programmed (on the production line or in operation) to produce any light output color, and any light intensity (e.g., 3 k or 4 k lumen). It also has a transceiver onboard that allows it to be reprogrammed at any time (e.g., after installation). This eliminates the need to produce and manufacture different lights for different applications, which greatly reduces inventory and can improve product profitability. In some examples, the lighting system 1 is intended to be a replacement for a chip on board (COB) light that includes a panel of tightly packed LEDs (i.e., high density of LEDs in a small area) and is capable of emitting a powerful and consistent/uniform beam (e.g., conical beam) of light. COBs, and hence the lighting system 1 of the present disclosure, can be used for aesthetics purposes in architectural designs, or can be used for illumination in general lighting applications. Commercially available COBs have a standard size, which this lighting system 1 needs to fit to. In some embodiments, the physical properties (e.g., form factor, dimensions, etc.) of the can of the lighting system 1 conform with the Zhaga standard defined by the Zhaga consortium (https://www.zhagastandard.org).

The input to the system 1 is an AC signal that may be provided by a neutral line and one power line from the wall (i.e., no ground line). The lighting system 1 may receive AC input from about 90 VAC to about 305 VAC (which is considered to be a high voltage). The system 1 performs the voltage conversion (AC-DC), and produces the desired light output. This is in contrast to the related art in which the light engines input DC voltages and relay on external power supplies that convert wall AC into a DC voltage. By incorporating the AC-DC voltage converting power supply into the same package as the light driver, the system 1 eliminates the need for an additional power supply, which saves cost and simplifies installation. However, as a result of this integration, the lighting system 1 encounters significant issues related to high voltages requirements, powerline quality requirements, thermal concerns, and insulation requirements, which the related art need not be concerned with nor address. Thus, embodiments of the present disclosure include features and solutions that significantly alleviate or completely eliminate the above concerns.

As noted above, one challenge to be overcome by the lighting system 1 is complying with power line quality requirements, which demand that the lighting system 1 be able to withstand lightening surges of about 2500 V on the AC lines at the input of the lighting system 1, which are the only high-voltage input into the unit. Two different types of surge that the lighting system 1 can withstand include differential surge between the two AC lines, and common mode surge, which is between one of the AC lines and ground. Both types of surges may be suppressed at least in part by the MOVs 42 and 47 of the rectifier 40 (see, e.g., FIG. 4).

Further, the lighting system 1 has to satisfy mandatory safety requirements related to insulation. As such, the lighting system 1 strategically employs insulation to avoid arcing between components, which could otherwise damage or destroy such components and to make the unit safe to touch by a user.

The light engines of the related art do not include any high energy surge suppression (only low level static charge/discharge) as, in the related art, the AC-DC power supply is outside of the lighting unit, and the power line quality requirements are exported to the external power supply, and thus not addressed by the light engine. Further, as the light engines of the related art operate at low voltages, user safety issues are minimal or non-existent. The following will describe in further detail the intelligent packaging of components and insulation use that allows all of the necessary components lighting system 1 to satisfy the added power line surge and insulation requirements.

Furthermore, thermal considerations are of great importance to the lighting system 1 as it incorporates the heat-generating light source (e.g., LEDs) within the same small can/packaging as all other components, and unless the generated heat is not dissipated properly, the rise in temperature within the light sources and the internal components can adversely affect the operation of the lighting system 1. Thus, in some embodiments, the lighting system 1 utilizes a metal heat sink as its backing which may efficiently transfer the internally-generated heat to the outside (e.g., via a heatsink fixture attached to the back of the lighting system 1).

Additionally, as the lighting system 1 is capable of directly connecting to wall AC, its has to satisfy stringent EMI requirements (such as class B and FCC/worldwide requirements related to radiative emissions) that include not injecting noise on, and not adding extra harmonics or distortions to, the AC input lines, and limiting radiative noise outside of the lighting system packaging/can. The primary switch 53 within the converter 52 (see, e.g., FIG. 4), which is controlled by the PFC controller 56, switches and pumps power rapidly during normal operation (e.g., at about 200 KHz) and produces a lot of broadband noise (e.g., common mode noise) and ringing throughout the circuitry of the lighting circuit 1. As the circuitry of the light driver 30 sits atop the metal backplate and is insulated from it by thin insulating layers, this structure acts as a large capacitor that may direct much of this noise (e.g., common mode noise) to the ground plane of the metal backing and thus the rest of internal circuitry. Accordingly, as will be described below, embodiments of the present disclosure address this issue through a variety of techniques.

Figure 7C:
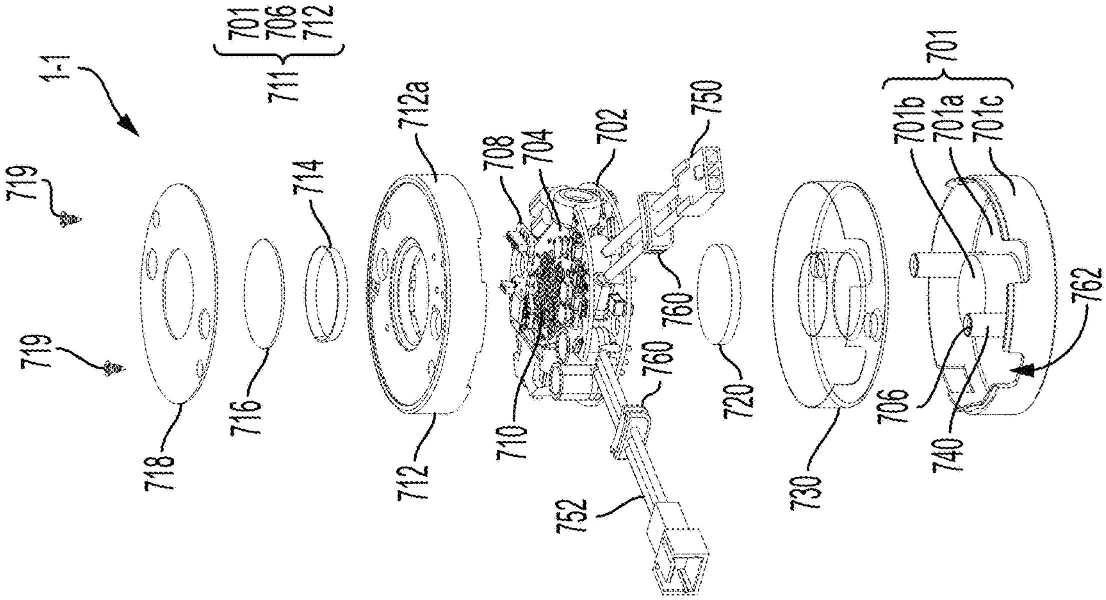
FIG. 7C illustrates an exploded perspective view of the lighting system, according to some embodiments of the present disclosure.
Figure 7A:
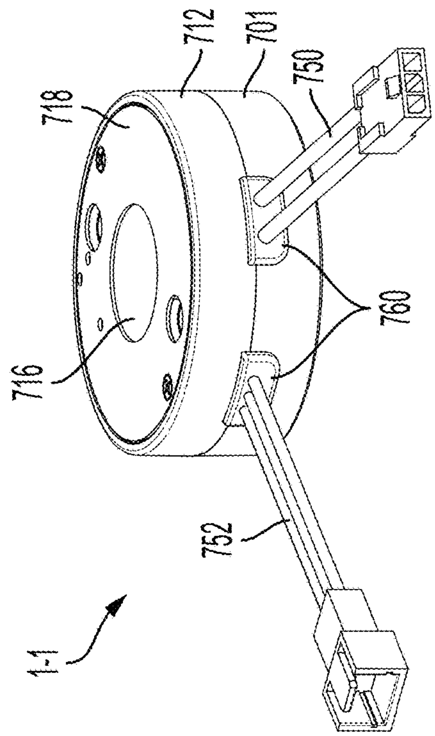
FIG. 7A illustrates a perspective view of the lighting system, according to some embodiments of the present disclosure.
Figure 7B:
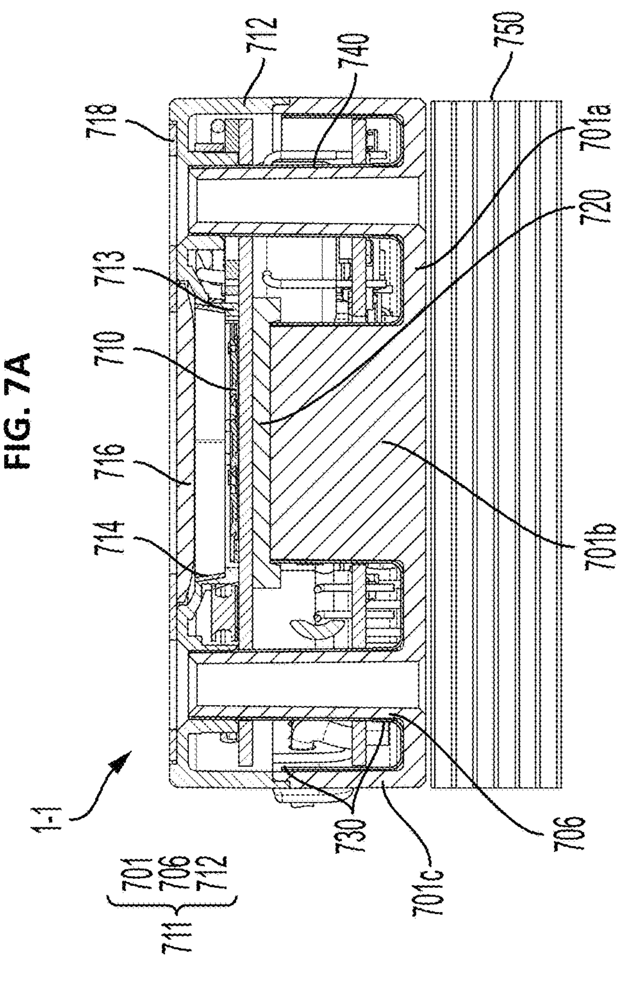
FIG. 7B illustrates a cross-sectional view of the lighting system, according to some embodiments of the present disclosure.

FIG. 7A illustrates a perspective view of the lighting system 1-1, according to some embodiments of the present disclosure. FIG. 7B illustrates a cross-sectional view of the lighting system 1-1, according to some embodiments of the present disclosure. FIG. 7C illustrates an exploded perspective view of the lighting system 1-1, according to some embodiments of the present disclosure.

Referring to FIG. 7A, the lighting system 1-1 is a tunable AC-input white LED engine having a wide light-emitting surface (LES) and high lumen output, which makes it suitable for general illumination applications. In some examples, the lighting system 1-1 may be a cylindrical light fixture having a diameter of about 50 mm; however, the diameter is not limited thereto and the lighting system 1-1 may have any suitable dimension. The flat top may have an aperture (e.g., a round lens) with an LES of about 19 mm. The light system 1-1 may be able to produce high light output of about 1200 lm or higher across a range of CCT settings. In some examples, the lighting system 1-1 may utilize 3-channel de-saturated (Fusion) LEDs to achieve precise blackbody line (BBL) tuning.

Referring to FIGS. 7B-7C, the lighting system 1-1 has a multi-layer structure including a first layer (e.g., a first printed circuit board (PCB) layer) 702, a second layer (e.g., a second PCB layer) 704 coupled to and vertically offset from the first layer 702 by two or more base posts 706, and a third layer (e.g., a third PCB layer) 708 that is above and coupled to the second layer 804. The layers 702, 704, and 708 may be PCBs having one or more layers (e.g., metal layers).

In some embodiments, the lighting system 1-1 further includes a housing 711 that encases/encapsulates the components within the lighting system 1-1, such as the power supply 50, the light driver 30, and the light source 710, and protects them from the elements. The housing 711 includes a heatsink base 701, a case cover 712, and the base posts 706 that are configured to couple the base plate 702 and the case cover 712. The heatsink base 701 includes a base plate 701*a* at the bottom side/backside of the lighting system 1-1 (which faces away from the layers 702, 704, and 708), a central pedestal structure 701*b* that protrudes from the heatsink base plate 701*a* toward the second layer 704, and a first sidewall (e.g., cylindrical sidewall; also referred to as a base sidewall) 701*c* extending from the periphery of base plate 701*a*. The heatsink base plate 701*a* and the pedestal 701*b* together form a heatsink for the light source 710 and the components of the lighting system 1-1.

The base plate 701*a*, the pedestal structure 701*b*, and the first sidewall 701*c* form the bottom portion of the exterior housing 711 of the lighting system 1-1, and may be monolithically formed out of the same material. However, embodiments of the present disclosure are not limited thereto. For example, the first sidewall 701*c* and the base plate 701*a* may be separately formed and may contain the same or different materials. The case cover 712 includes second side walls 712*a* (also referred to as cover sidewalls) extending downward from the top of the case cover 712 to meet (e.g., align or mate with) the first sidewalls 701*c* of the heatsink base 701. Thus, the case cover 712 may form the upper portion of the housing 711.

In some embodiments, the first and second layers 702 and 704 may be ring-shaped and may each have an opening in their center that allows the pedestal 701*b* to pass therethrough. Further, the first and second layers 702 and 704 may have the same or substantially the same diameter; however, embodiments of the present disclosure are not limited thereto, and the first and second layers 702 and 704 may have any suitable shape and size to fit within an existing wall fixture. For example, as shown in FIG. 7B, the first and second layers 702 and 704 overlap one another in a plan view. Further, the third layer 708 may at least partially overlap (e.g., entirely overlap) the first and second layers 702 and 704 in a plan view. The first and second layers 702 and 704 may be vertically offset from the base plate 701*a* of the heatsink base 701, thus allowing components to be mounted one both sides of at least one of the first and second layers 702 and 704.

In some embodiments, the integrated multi-layered lighting system 1-1 includes a light source 710 that includes a plurality of light emitting diodes (LEDs) coupled to the second layer 804, which is supported by and is thermally connected to the heatsink pedestal 701*b*. The third layer 708, which is positioned above the second layer 704, is positioned to the side of the light source 710 and thus does not obstruct the light produced by the LEDs thus allowing light to illuminate the target environment without impediment. The light source 710 may include one or more green LEDs of the green channel 20, one or more blue LEDs of the blue channel 22, and one or more red LEDs of the red channel 24. In some examples, the LEDs 710 are unsaturated LEDs, which serve to provide a more vibrant and consistent color to illuminated objects as compared to saturated LEDs. Unlike saturated LEDs, which may lack certain bands of light from the visible light spectrum, unsaturated LEDs produce light evenly among the spectrum and consistently fill in empty spaces on the light spectrum that otherwise may not be filled by saturated LEDs.

In some embodiments, the case cover 712 may have at its center an inwardly tapered portion (e.g., an inner wall or an inner/inward extension portion) 713 that defines a housing opening (e.g., an inwardly tapered opening) that can act as a light tunnel directing light produced by the light source 710 to the outside. The inwardly tapered portion 713 has an inner diameter that increases in a vertical direction away from the light source 710 toward the outside (e.g., towards the lens 716). The bottom edge of the tapered portion 713 having the smallest inner diameter may encapsulate the light source 710 in a plan view (i.e., the light source 710 is entirely within the opening of the housing 711 in a plan view. A reflector (e.g., tapered reflector; such as, a metal reflector) 714 may be placed inside the case/housing opening (e.g., on the inwardly tapered portion 713) to reflect light of the light source 710 incident on the interior surface of the tapered portion 713 of the case cover 712 to the outside, and thus ensure that the light produced by the light source 710 is not absorbed by the interior walls of the case/housing opening. This may improve (e.g., increase) the light extraction efficiency of the lighting system 1-1. A lens (e.g., a glass lens) 716 may fit within a peripheral notch (or stepped portion) of the case cover 712 and be held in place above the light source 710 by a cap (e.g., a ring-shaped hold-down cap) 718 that is configured to be fixedly attached to (e.g., fastened or screwed to) the top of the case cover 712, for example, via one or more screws 719.

The base posts 706 may extend vertically from the base plate 701*b* to the top of the case cover 712 within the interior space of the housing 711. The base posts 706 may not only couple the case cover 712 to the base plate 701*a*, but they also support the second layer 704 above the first layer 702. In some examples, the base posts 706 may have a hollow interior allowing a fastener to pass therethrough and couple the lighting system 1-1 to a heatsink mount (e.g., a fixture heatsink) 750, which may be a passive heat exchanger or an active heat exchanger (e.g., including a fan).

As the light source 710 may generate a lot of heat in the tightly confined space of the lighting fixture 1-1, thermal management is an important consideration for proper and stable operation of the lighting system 1-1.

To improve the dissipation of heat generated by the light source 710, the second layer 704 that has the light source 710 mounted thereto is placed on top of the heatsink pedestal 701*b*, which is thermally and electrically conductive and channels/transfers the LED-generated heat to the heatsink base 701 and the outside. In some examples, a thermal conductivity pad 720 may fill the gap between the light source 710 and the top surface of the conductive (and grounded) pedestal 701*b* in order to further improve heat dissipation through the pedestal 701*b*. The thermal pad 720 may have a low thermal resistance (be thermally conductive), but be an electrical insulator so as to avoid creating an unintentional electrical connection between components of the second layer 704. Further, the adhesive nature of the thermal gap pad 720 helps to improve the stability and structural integrity of the two layers 702 and 704 (as they are otherwise held together by two base posts 706). The thicker the thermal pad 720, the lower the resistance between the back of the light source 710 and the pedestal 701*b*. In some examples, the thermal padding 720 may be about 2 mm thick. Therefore, any capacitance resulting from the presence of the thermal pad 720, which is electrically insulative, between conductive pedestal 701*b* and the metal backing of the light source 710 is very small, and does not affect the operation of the circuitry of the lighting system 1-1. In other words, the noise generated by the system 1-1 (e.g., the primary switch 53) does not have a meaningful path to safety ground. As such, the design of the embodiments of FIGS. 7A-7C does not need a decoupling capacitor to decouple the safety ground of the heatsink structure and driver ground.

The heatsink base 701 and pedestal 701*b* may be cast out of the same material and form a single integrated/monolithic heatsink structure; however, embodiments of the present disclosure are not limited thereto. For example, the heatsink base 801 and the pedestal 701*b* may be separately formed (e.g., separately cast) and fixed together (e.g., via welding or a fastening mechanism). In some examples, the heatsink base 701 may be made of copper, aluminum, or any other suitable material that is sufficiently electrically and thermally conductive.

The metal heatsink base 701 may extend continuously or substantially continuously across the bottom surface of the lighting system 1-2, and the pedestal 701*b* may have a sufficient diameter to maintain the temperature of the LEDs 710 at a desired temperature range of, for example, about 30° C. to about 40° C. Without the heat sink properties of the heatsink structure 701 and 701*b*, the LEDs 710 may operate at significantly higher temperatures (e.g., about 20° C. to 30° C. higher), which could lead to a change in the LED characteristics and to an undesirable change in the color and intensity of the light output of the lighting system 1-1. The heatsink structure 701 may also act as the safety ground of the lighting system 1-1.

In some embodiments, the base post 706 is cast out of the same material as the heatsink base 701 and may form a monolithic structure therewith. However, embodiments of the present disclosure are not limited thereto, and for example, the base posts 706 may be separately formed and then fastened to the heatsink base 701.

In addition to acting as a heatsink, the pedestal 701*b* positions the LEDs 710 closer to the round aperture 716, which allows the lighting system 1-1 to improve light extraction efficiency and to achieve a target 100 lumens/watt out of the small aperture. The pedestal structure 701*b* may slightly increase thermal resistance from the back of the LEDs 710 to the back plate. Therefore, in some examples, to compensate for this added thermal resistance and to maximize heat transfer from the LEDs 710 to the back surface of the heatsink base 701, copper may be used as the casting material, as it has higher thermal conductivity than aluminum.

In some embodiments, the base posts 706 are insulated from ground (e.g., safety ground. For example, the base post 706 may made of insulating materials to prevent components of the lighting system 1-1 from being accidentally connected to electrical ground. In some examples, the base posts 706 may be made of conductive material and be safety grounded. In such examples, it is desirable to insulate the posts 706 from the rest of the lighting system circuit. Therefore, a base insulator 730 is placed above the heatsink base 701 and one or more rolled insulators 740 may be positioned around the vertical base posts 706 to insulate the safety-grounded heatsink base 701 from the electrical components of the lighting system 1-1. The base insulator 730 may have openings therethrough to correspond to the pedestal 701*b* and the two base posts 706 and may have circular protrusions (including a pedestal cover portion 732 and post covers 734) that cover the bottom portion of the side surfaces of the pedestal 701*b* and the two base posts 706. The rolled insulators 740 may be secured to the pedestal 701*b* and the two base posts 706 by tape, sonic welding, heat welding, vacuum sealing, or any other suitable mechanism. The base insulator 730 and the rolled insulators 740 may be made of high voltage resistant, high temperature resistant (and, e.g., self-extinguishing), and electrically insulative material. The material may also be thermally conductive to improve heat dissipation through the heatsink base 701. However, embodiments of the present disclosure are not limited thereto. For example, the case cover 712 may include insulated post covers (e.g., plastic post covers) that cover and insulate the base posts 706 and pedestal 701*b*, and prevent other electrical components from making physical and electrical contact with these elements. In some examples, the rolled insulator 740 may be mylar tape or any other suitable material.

In some embodiments, the lighting system 1-1 is coupled to the input AC source 10 via the AC input lines 750, and is coupled to a CCT/DIMM programming device 300 or via programming lines 752 that include a CCT line (or a CCT wire or CCT control wire), a DIMM line (or a DIMM wire or dimming control wire), and a common lines (or a common wire). The AC input lines 750 and the programming lines 752 may be electrically coupled to one of the layers 702, 704, and 708 (e.g., coupled to the first layer 702) via slots/openings 762 in the heatsink base 701 that are sealed by two grommets 760. As shown in FIGS. 7A-7D, in some embodiments, the AC input lines 750 and the programming lines 752 penetrate the side of the lighting system 1-1; however, embodiments of the present disclosure are not limited thereto. For example, the AC input lines 750 and the programming lines 752 may be connected to the bottom side of the lighting system 1-1. In some examples, the AC input lines 750 and the programming lines 752 may be about 5 cm long. The AC input lines 750 may be attached to a Molex micro-fit terminal, and the programming lines 752 may be attached to a Molex mini-latch terminal.

Figure 8C:
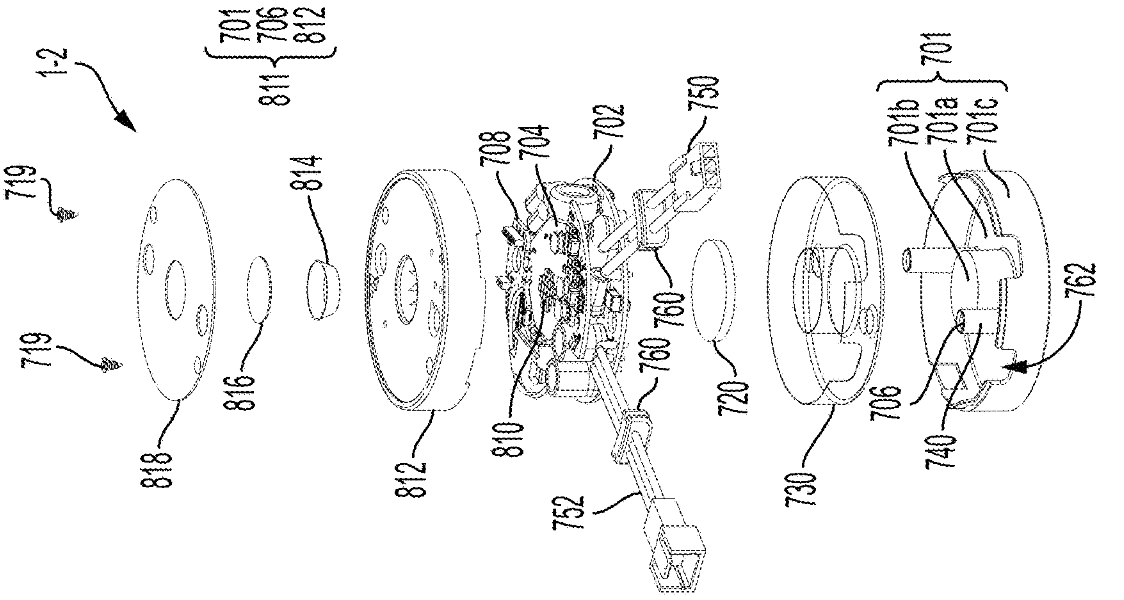
FIG. 8C illustrates an exploded perspective view of the lighting system, according to some embodiments of the present disclosure.
Figure 8A:
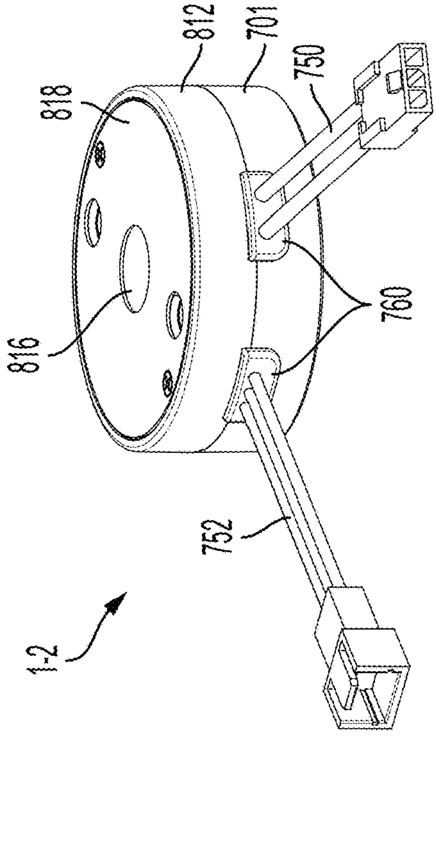
FIG. 8A illustrates a perspective view of the lighting system, according to some embodiments of the present disclosure.
Figure 8B:
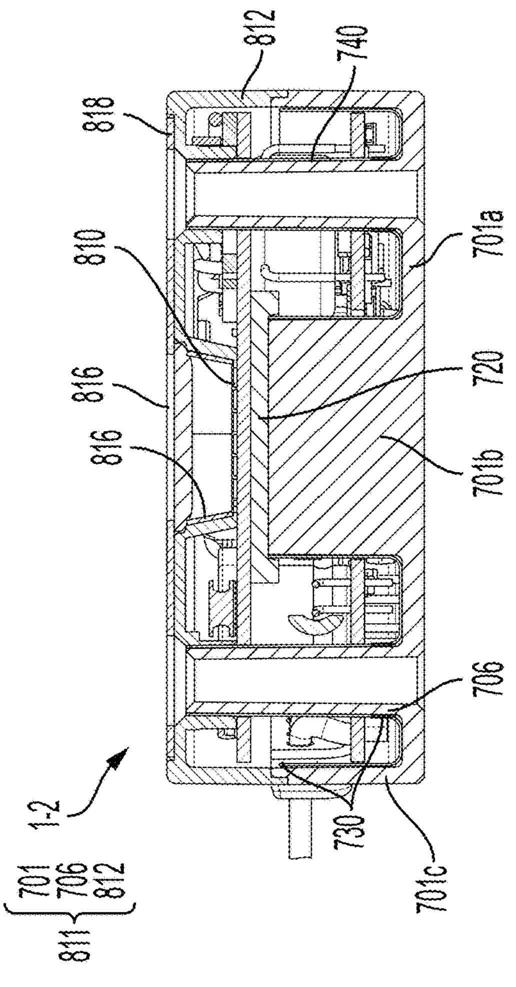
FIG. 8B illustrates a cross-sectional view of the lighting system, according to some embodiments of the present disclosure.

FIG. 8A illustrates a perspective view of the lighting system 1-2, according to some embodiments of the present disclosure. FIG. 8B illustrates a cross-sectional view of the lighting system 1-2, according to some embodiments of the present disclosure. FIG. 8C illustrates an exploded perspective view of the lighting system 1-2, according to some embodiments of the present disclosure.

Figure 9C:
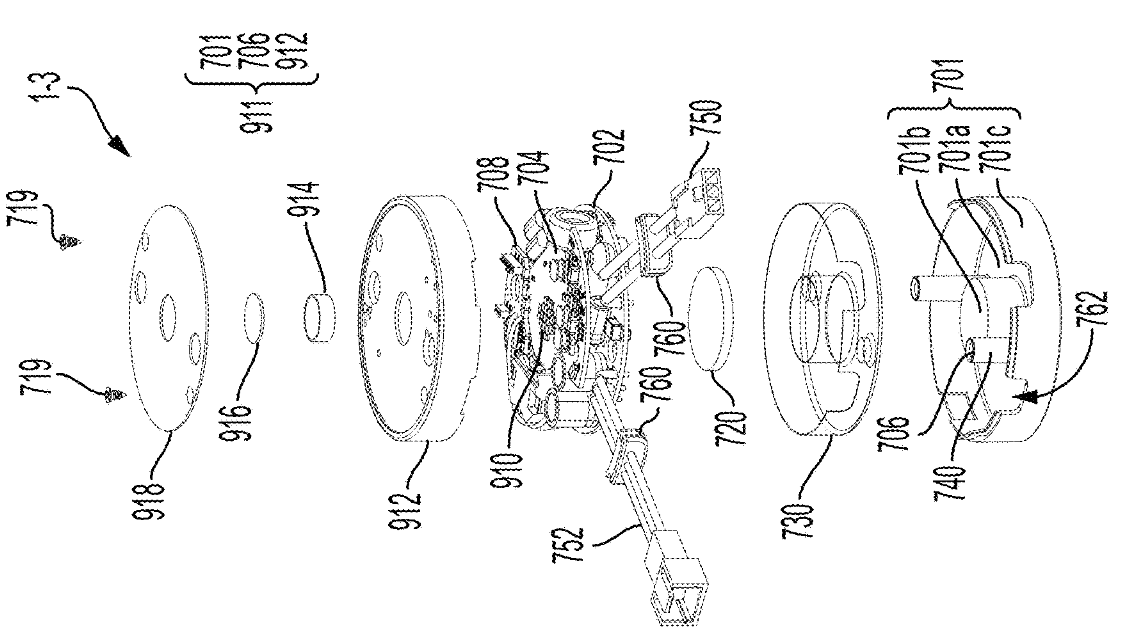
FIG. 9C illustrates an exploded perspective view of the lighting system, according to some embodiments of the present disclosure.
Figure 9A:
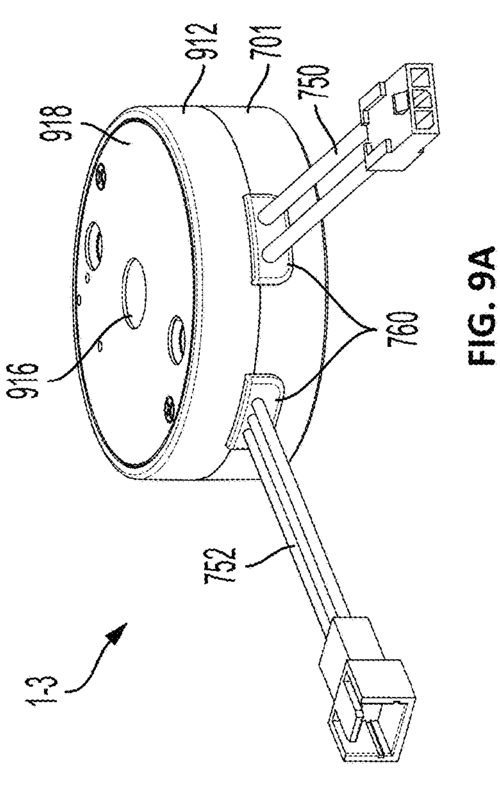
FIG. 9A illustrates a perspective view of the lighting system, according to some embodiments of the present disclosure.
Figure 9B:
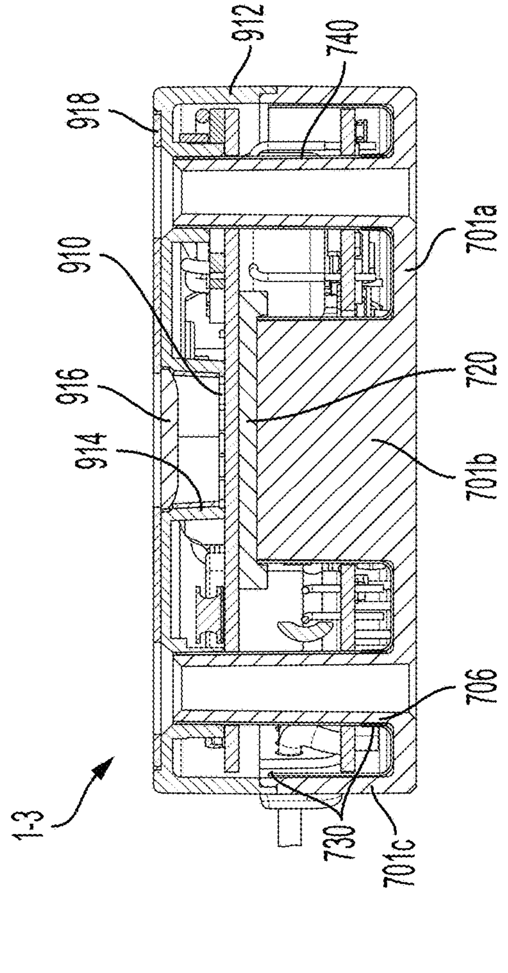
FIG. 9B illustrates a cross-sectional view of the lighting system, according to some embodiments of the present disclosure.

FIG. 9A illustrates a perspective view of the lighting system 1-3, according to some embodiments of the present disclosure. FIG. 9B illustrates a cross-sectional view of the lighting system 1-3, according to some embodiments of the present disclosure. FIG. 9C illustrates an exploded perspective view of the lighting system 1-3, according to some embodiments of the present disclosure.

Figure 10C:
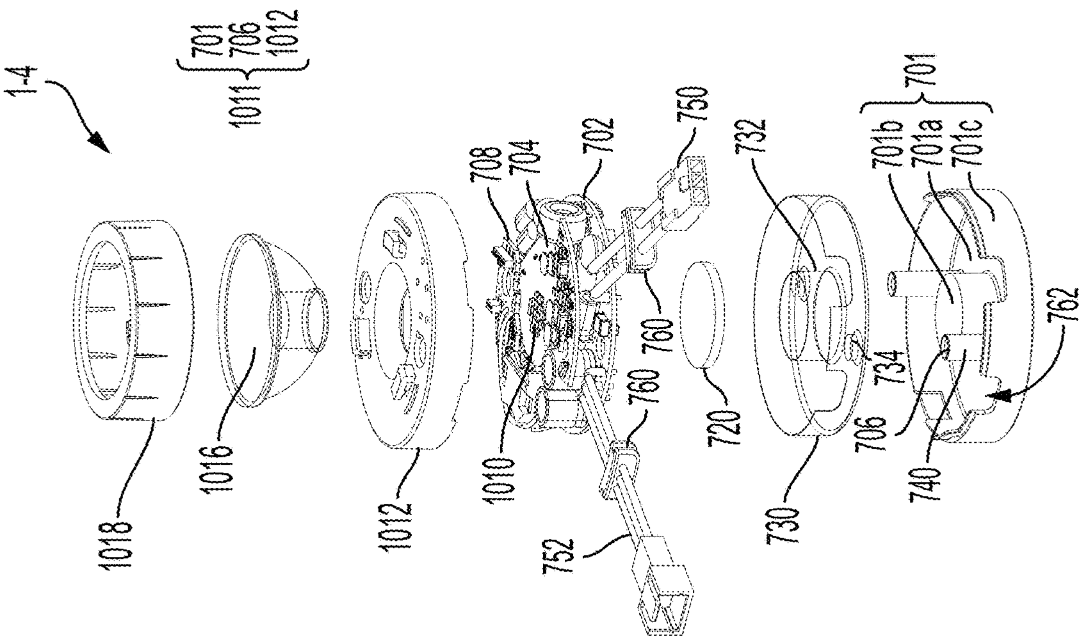
FIG. 10C illustrates an exploded perspective view of the lighting system, according to some embodiments of the present disclosure.
Figure 10A:
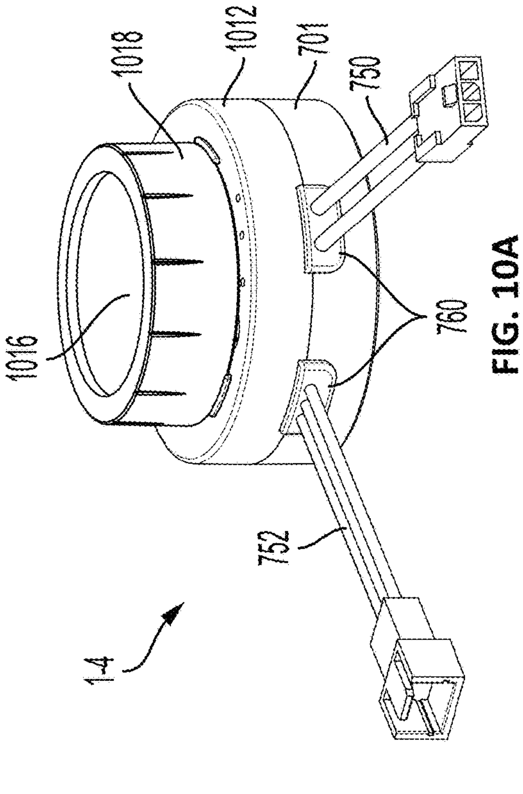
FIG. 10A illustrates a perspective view of the lighting system, according to some embodiments of the present disclosure.
Figure 10B:
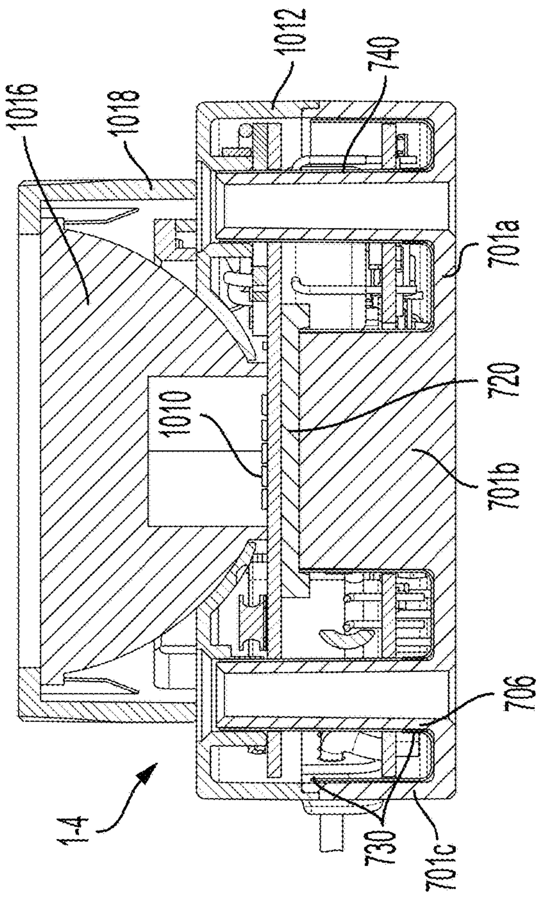
FIG. 10B illustrates a cross-sectional view of the lighting system, according to some embodiments of the present disclosure.

FIG. 10A illustrates a perspective view of the lighting system 1-4, according to some embodiments of the present disclosure. FIG. 10B illustrates a cross-sectional view of the lighting system 1-4, according to some embodiments of the present disclosure. FIG. 10C illustrates an exploded perspective view of the lighting system 1-4, according to some embodiments of the present disclosure.

Here, the lighting system 1-2, the lighting system 1-3, and the lighting system 1-4 are substantially similar to the lighting system 1-1, except for differences in the lens sizes and types, and the LEDs utilized, and some of the corresponding electronic circuitry. In the interest of brevity, the following description will mainly focus on differences between the lighting systems 1-1, 1-2, 1-3, and 1-4, and descriptions of common or substantially similar elements and features may not be repeated herein.

For example, referring to FIGS. 8A-8C and 9A-9C, the lighting system 1-2 and the lighting system 1-3 have lens diameters that are about 12 mm and about 9 mm, respectively. Accordingly, the reflector 814 and the lens 816 of the lighting system 1-2 and the reflector 914 and the lens 916 of the lighting system 1-4, are corresponding to the reflector 714 and the lens 716 of the lighting system 1-1. Similarly, the case covers 812 and 912 (of the housings 811 and 911, respectively) of the lighting systems 1-2 and 1-3 and the hold-down caps 812 and 912 of the lighting systems 1-2 and 1-3 have openings that are smaller than those of the lighting systems 1-1.

Referring to FIGS. 10A-10C, the lighting system 1-4 utilizes a total internal reflection (TIR) lens 1016, which is a compound lens that combines the characteristics of both a reflector and a lens to improve (e.g., maximize) the beam shaping capabilities. The TIR lens 1016 may include a cone-like lenses having rotational symmetry, which provides a desirable round light distribution. In some examples, the TIR lens 1016 may be fix into position above the LEDs 1010 via a protruding hold-down cap 1018 that encapsulates the TIR lens 1016 and being twist locked onto the case cover 1012 of the housing 1011.

Figure 11C:
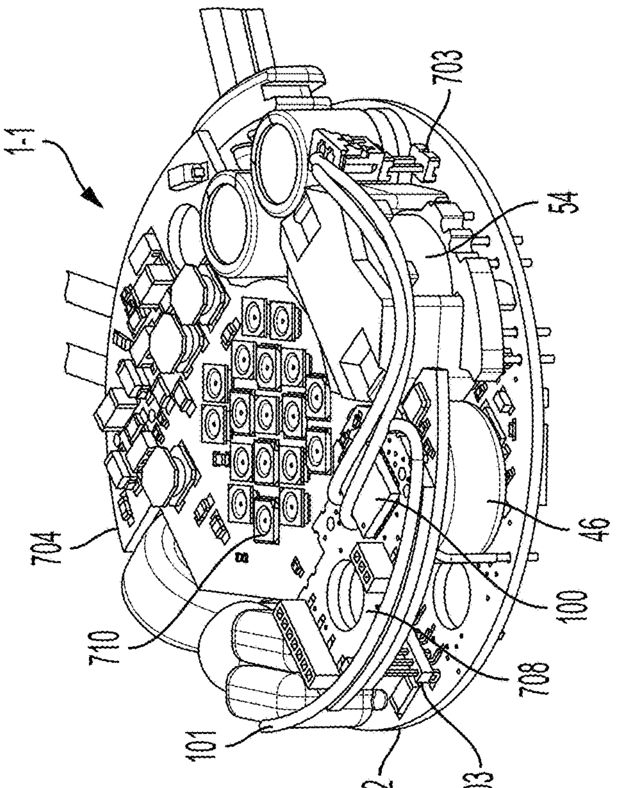
FIG. 11C illustrates a perspective view of the layers of the lighting system onto which the internal electrical components are mounted, according to some embodiments of the present disclosure.
Figure 11A:
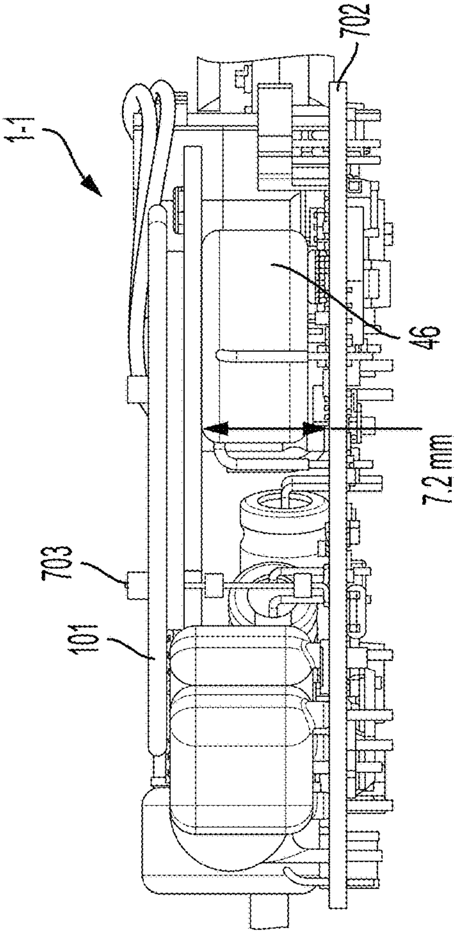
FIGS. 11A and 11B illustrate side views of the layers of the lighting system onto which the internal electrical components are mounted, according to some embodiments of the present disclosure.
Figure 11B:
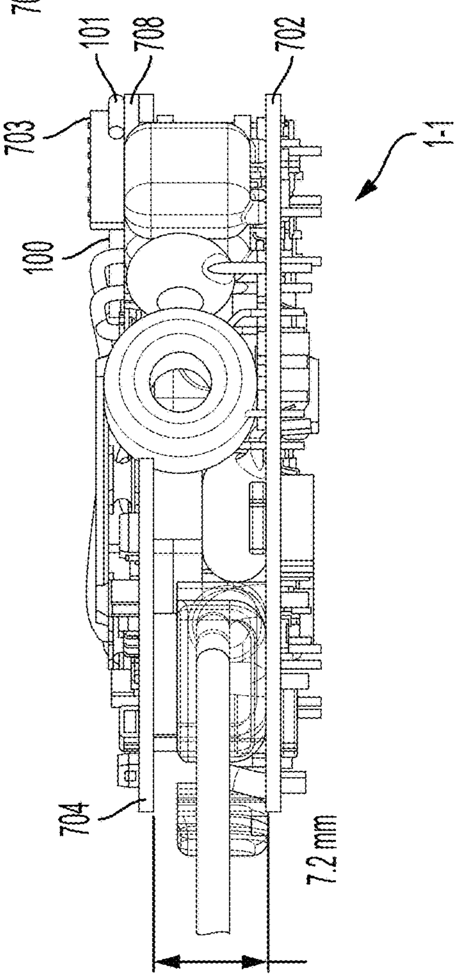
Figure 11F:
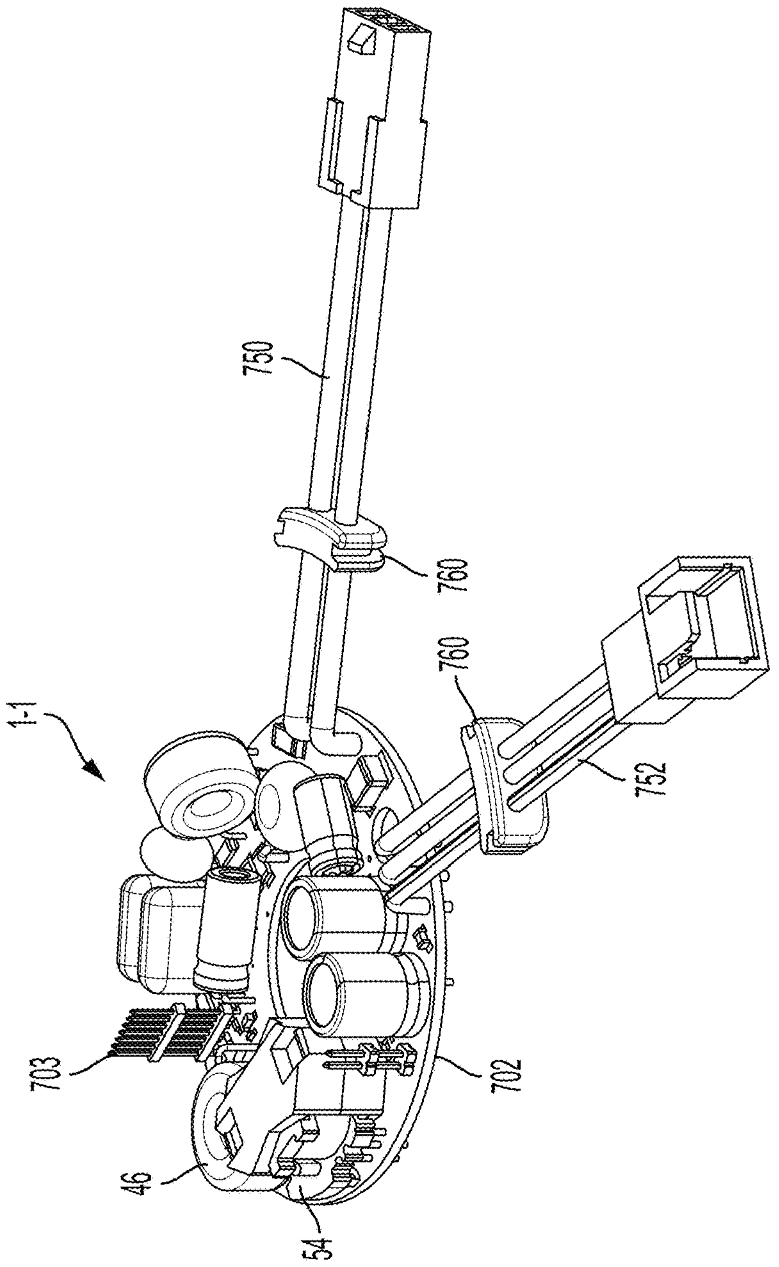
FIG. 11F illustrates a perspective view of the first layer of the lighting system onto which some of the internal electrical components are mounted, according to some embodiments of the present disclosure.
Figure 11D:
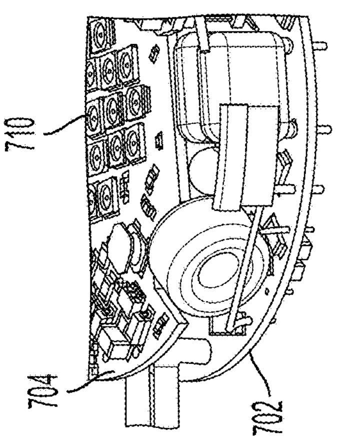
FIGS. 11D and 11E illustrate partial perspective views of the layers of the lighting system 1-1, according to some embodiments of the present disclosure.
Figure 11E:
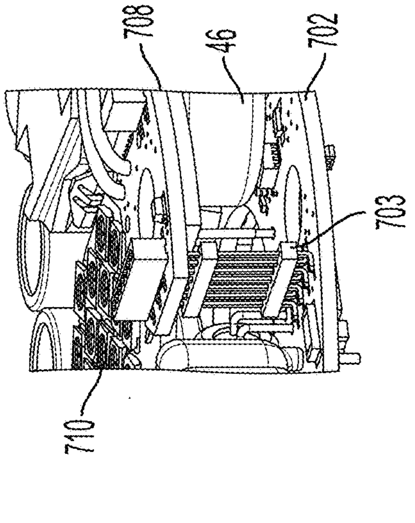

FIGS. 11A and 11B illustrate side views of the layers of the lighting system 1-1 onto which the internal electrical components are mounted, according to some embodiments of the present disclosure. FIG. 11C illustrates a perspective view of the layers of the lighting system 1-1 onto which the internal electrical components are mounted, according to some embodiments of the present disclosure. FIGS. 11D and 11E illustrate partial perspective views of the layers of the lighting system 1-1, according to some embodiments of the present disclosure. FIG. 11F illustrates a perspective view of the first layer 804 of the lighting system 1-1 onto which some of the internal electrical components are mounted, according to some embodiments of the present disclosure.

Referring to FIGS. 11A-11F, in some embodiments, the electronic components of the lighting system 1-1 are mounted on both sides of each of the first and second layers 702 and 704.

The lighting system 1-1 includes a plurality of first components coupled to the first layer 702, a plurality of second components coupled to the second layer 704, and a plurality of third components coupled to the third layer 708.

According to some embodiments, the plurality of first components include through-hole-mounted electrical components, the plurality of second components include surface-mount electrical components, and the plurality of third components include surface-mount electrical components and one or more through-hole-mounted electrical components.

The first components may be mounted to (e.g., soldered to) at least the top surface (i.e., forward-facing side) of the first layer 702 and are electrically coupled to one another via a plurality of electrical traces. In some examples, some of the first components (e.g., some surface-mount components) may be mounted to the bottom surface of first layer 702. The first components on opposite sides of the first board 704 may also be electrically connected through one or more electrical vias within the first layer 704. The second components may be placed on at least one of the rear-facing side of second layer 704 (which faces the top side of the first layer 702) and the top side (i.e., forward-facing side) of the second layer 704 (which is opposite from the bottom side of second layer 704), and are connect to one another through traces running on the top and/or bottom of the second layer 704.

Referring to FIGS. 11A-11F, in some examples, the plurality of first components mounted to the first layer 704 may include the rectifier 40 (and its many constituent components, such as the input bulk capacitor 43, the CM choke 44, and differential choke 46), the input voltage detector 400, the active load 402, the negative injection circuit 404, the pulse generator 406, the PFC controller 56, the converter 52 (including the switch 53), the bus rectifier 70, the dimming controller 200 and the associated one or more optocouplers. The plurality of second components mounted to the second layer 704 may include the channel regulators 80 and the LEDs 710. The plurality of third components mounted to the third layer 708 may include the channel controller 100, the antenna wire, and other components, such as small resistors, capacitors, inductors, and transistors.

Thus, according to some embodiments, the noisy, high voltage and fast switching components of the lighting system 1-1 are mounted onto the first layer 702, which are separated from the quieter and lower-voltage elements of the lighting system 1-1 via an air gap between the first layer 702 and the second and third layers 704 and 708. As the primary switch 53 of the converter 52 may heat up during normal operation, a heatsink (e.g., a copper heatsink) may be placed on it to help dissipate heat and improve thermal management.

In some examples, the second and third components mounted on the second and third layers 704 and 708 may be electrically connected to the first components of the first layer 702 via one or more electrical connectors/links 703.

In some embodiments, the channel controller 100 on the third layer 708 has an internal wireless transceiver (e.g., with bluetooth and/or wifi capability), which may allow the lighting system 1-1 to be dimmed or generally programmed remotely. As such, an antenna 101 of appropriate length may be coupled to the third layer 708 (e.g., via an antenna pin and connector) as shown in FIGS. 11A-11C. In some examples, at least a portion of the antenna 101 may extend along an outer edge of the third layer 708. The channel controller 100 is compatible with DALI 2.0, 0-10V, DMX, Serial interface, BLE, and the like.

Accordingly, as described above, the multi-tiered design of the lighting system provides additional surface area to mount the various components of the light driver 30 in the vertical direction, which allows the lighting system to have a more compact design with a smaller footprint, as compared to designs of the related art.

Figure 12A:
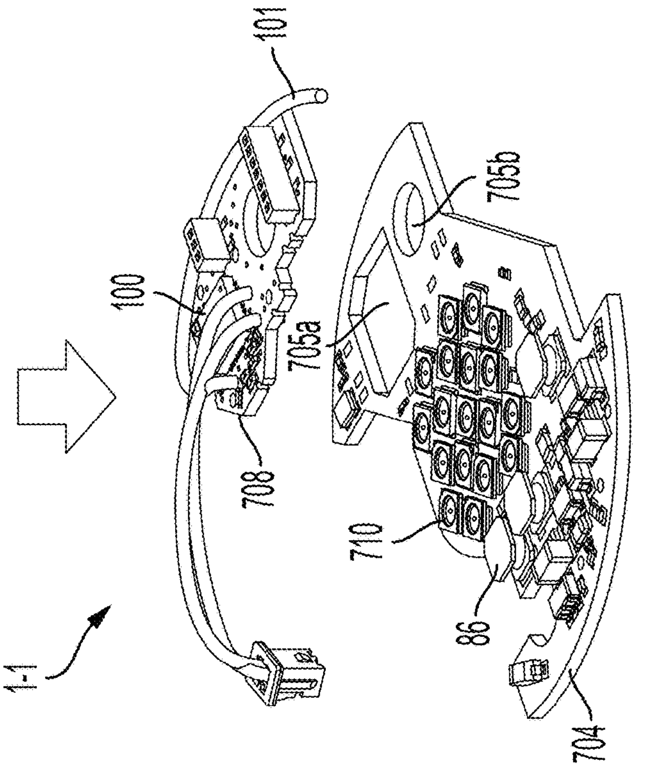
FIG. 12A illustrates an exploded perspective view of the second and third layers of the lighting system, according to some embodiments of the present disclosure.
Figure 12B:
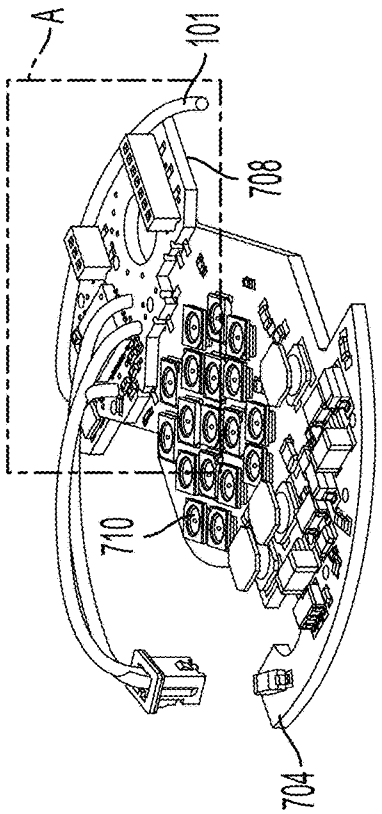
FIG. 12B illustrates a perspective view of the assembled second and third layers of the lighting system, according to some embodiments of the present disclosure.
Figure 12C:
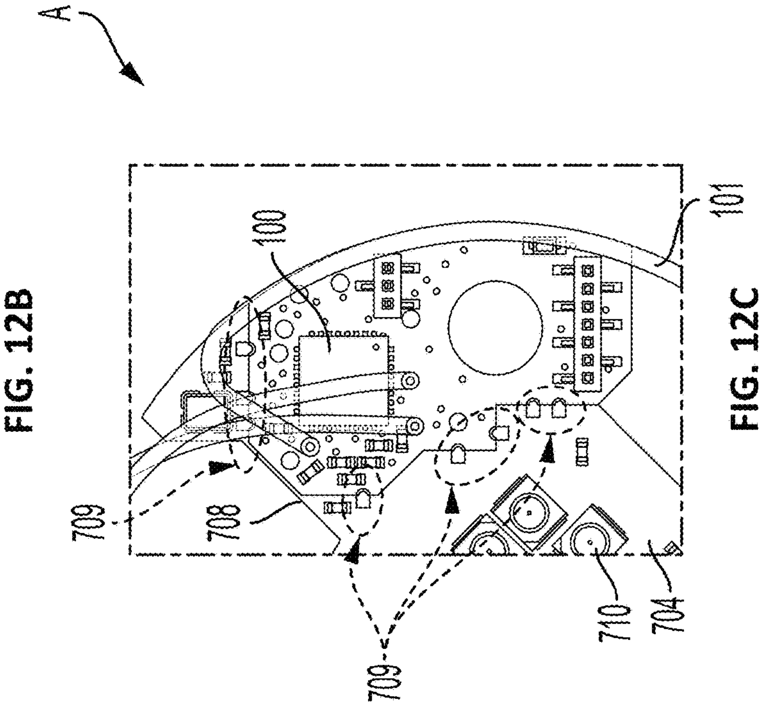
FIG. 12C illustrates a partial top view of the second and third layers of the lighting system with a focus on the area A of FIG. 12B, according to some embodiments of the present disclosure.
Figure 12F:
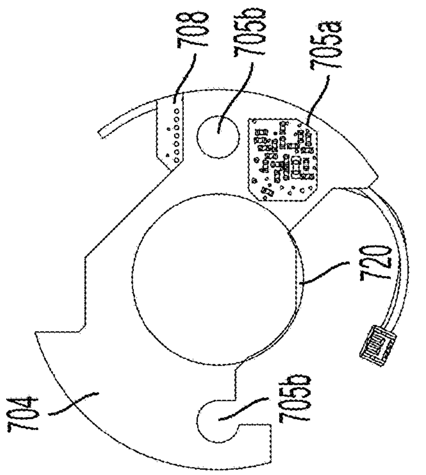
FIGS. 12E and 12F illustrates perspective topside and underside views, respectively, of the third layer and the thermal pad of the lighting system, according to some embodiments of the present disclosure.
Figure 12E:
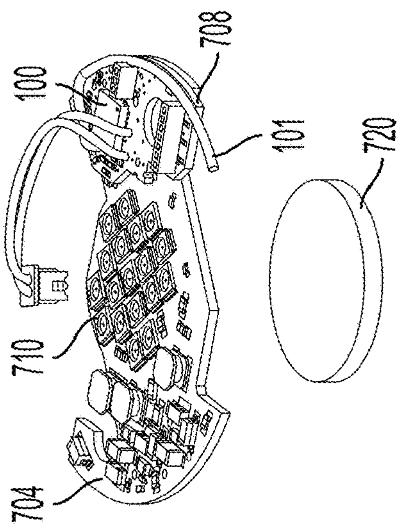
Figure 12D:
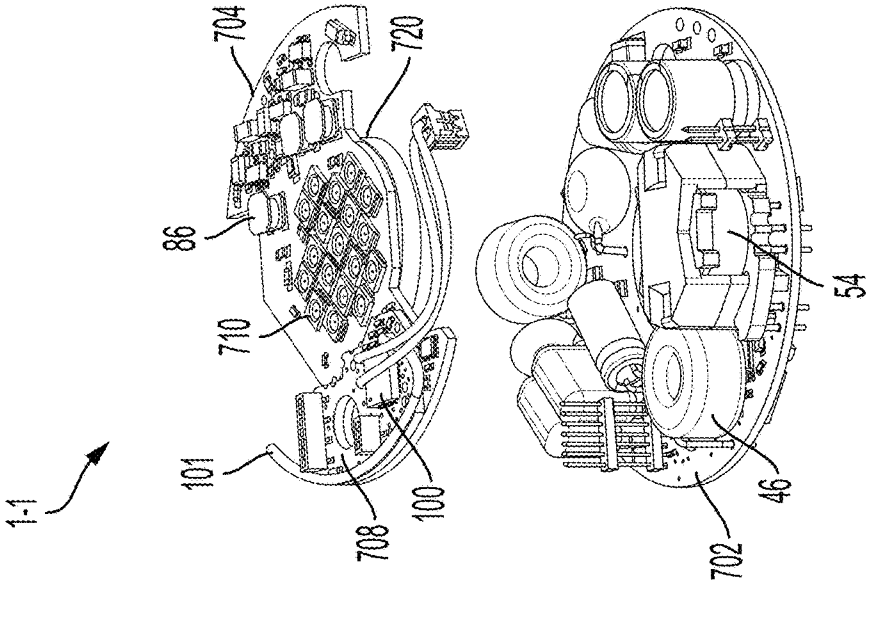
FIG. 12D illustrates a disassembled perspective view of the first to third layers of the lighting system, according to some embodiments of the present disclosure.

FIG. 12A illustrates an exploded perspective view of the second and third layers 704 and 708 of the lighting system 1-1, according to some embodiments of the present disclosure. FIG. 12B illustrates a perspective view of the assembled second and third layers 704 and 708 of the lighting system 1-1, according to some embodiments of the present disclosure. FIG. 12C illustrates a partial top view of the second and third layers 704 and 708 of the lighting system 1-1 with a focus on the area A of FIG. 12B, according to some embodiments of the present disclosure. FIG. 12D illustrates a disassembled perspective view of the first to third layers 702, 704, and 708 of the lighting system 1-1, according to some embodiments of the present disclosure. FIGS. 12E and 12F illustrates perspective topside and underside views, respectively, of the third layer 708 and the thermal pad 720 of the lighting system 1-1, according to some embodiments of the present disclosure.

Referring to FIGS. 12A-12C and 12F, in some embodiments, the third layer 708 is positioned on top of the second layer 704 and at its periphery. The two PCB boards may be electrically coupled to one another via a plurality of reflow connections 709 at the interior edges of third layer 708, which connect to corresponding electrical pads on the second layer 704. In some examples, the edge reflow connections 709 may be formed through a reflow solder process and/or a wave solder process. The second layer 704 may have a first opening 705*a* corresponding to the location of the channel controller 100 on the third layer 708. This first opening 705*a* permits the placement of some third electrical components under the channel controller 100 and through the second layer 704 (see, e.g., FIG. 12F), which leads to greater integration and a more compact design for the lighting system 1-1.

The second and third layers 704 and 708 may each have a second opening 705*b* to accommodate one of the vertical posts 706, thereby fixing the second and third layers 704 and 708 to the vertical post 706 and stabilizing their position within the housing of the lighting system 1-1.

Referring to FIGS. 12D-12F, in some embodiments, the lighting system 1-1 includes a thermal pad (e.g., a round thermal pad) 720 under the second layer 704 in a position that corresponds to the light source 710, which serves to enhance the thermal connection between the backside of the second layer 704 and the top of the pedestal 701*b* and improves the ability of the pedestal 701*b* to sink heat away from the light source 710. This allows the light source 710 to operate in a safe temperature zone and thus maintain desirable operational characteristics.

Figure 13A:
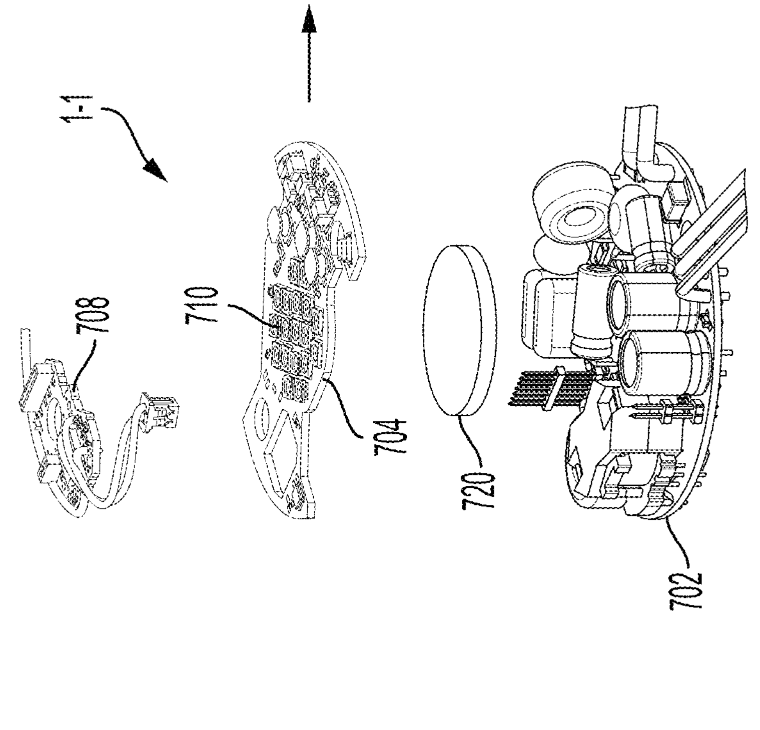
FIGS. 13A, 13B, and 13C illustrate exploded perspective views of the lighting systems, respectively, according to some embodiments of the present disclosure.
Figure 13B:
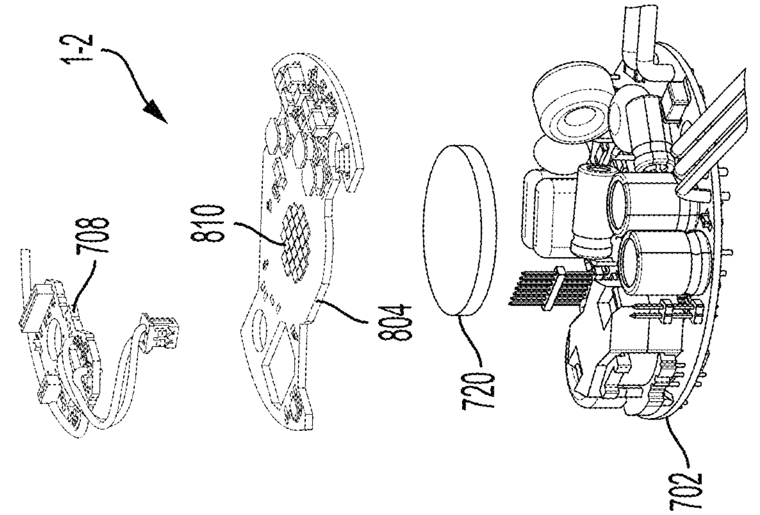
Figure 13C:
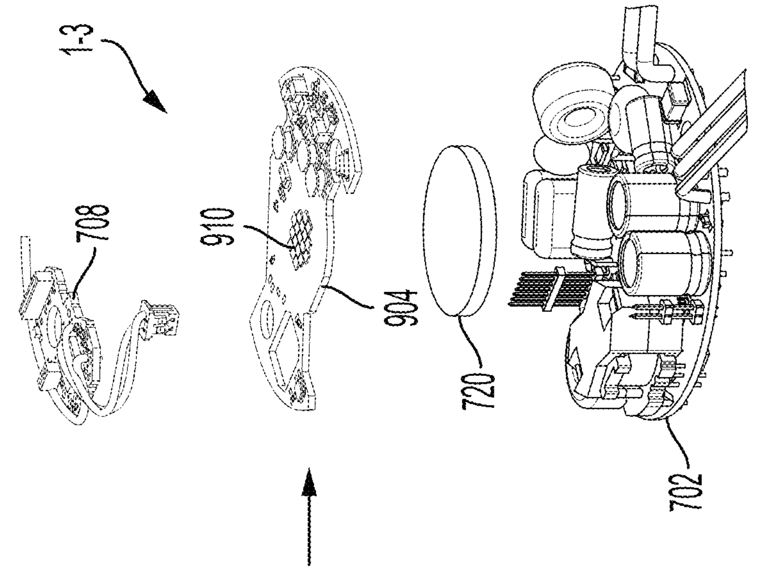

FIGS. 13A, 13B, and 13C illustrate exploded perspective views of the lighting systems 1-1, 1-2, and 1-3, respectively, according to some embodiments of the present disclosure.

Referring to FIGS. 13A-13C, the lighting systems 1-1, 1-2, and 1-3 utilize the same first layer 702 and corresponding electronic components, and the same third layer 708 and corresponding electronic components, with the primary difference being the differences in the LEDs used in each lighting system.

Figure 14A:
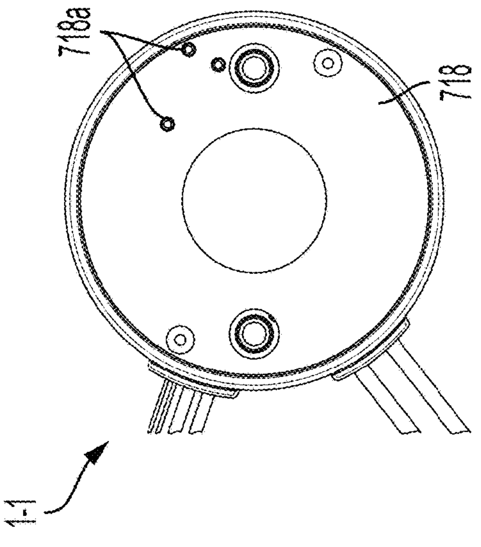
FIGS. 14A and 14B illustrate top views of the lighting system with and without the diffuser-cap installed, respectively, showing a plurality of probing holes, according to some embodiments of the present disclosure.
Figure 14B:
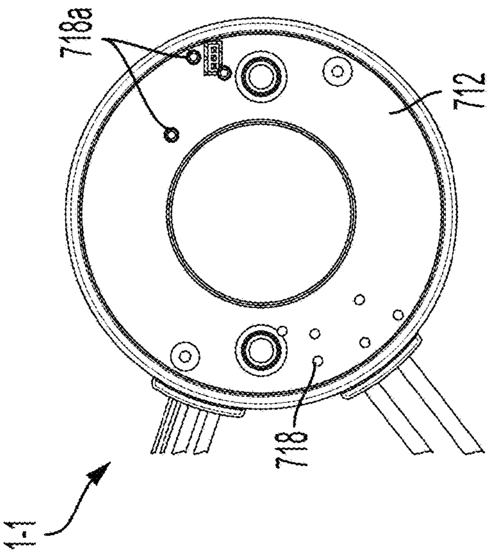
Figure 14C:
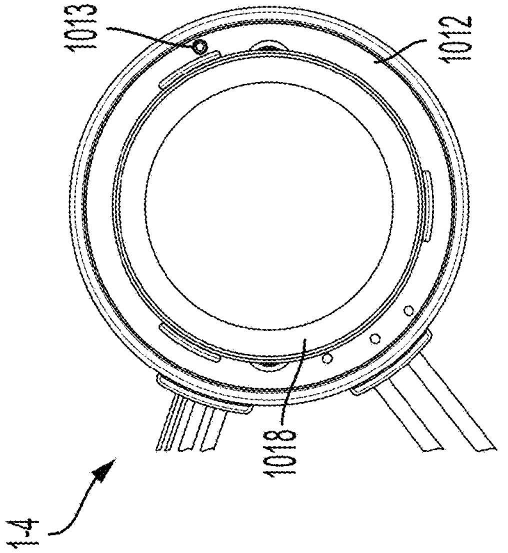
FIGS. 14C and 14D illustrate top views of the lighting system with and without the lens holder and TIR lens, respectively, showing a plurality of probing holes, according to some embodiments of the present disclosure.
Figure 14D:
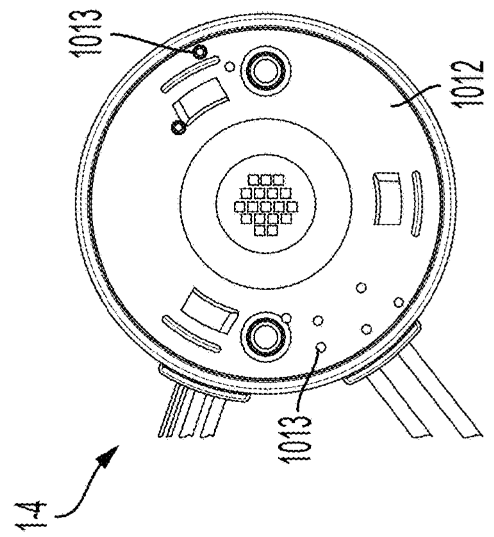

FIGS. 14A and 14B illustrate top views of the lighting system 1-1 with and without the diffuser-cap installed, respectively, showing a plurality of probing holes, according to some embodiments of the present disclosure. FIGS. 14C and 14D illustrate top views of the lighting system 1-4 with and without the lens holder and TIR lens, respectively, showing a plurality of probing holes, according to some embodiments of the present disclosure.

Referring to FIGS. 14A-14D, while the housing of the lighting system generally seals the electronic components from the outside to protect them from the elements, in some embodiments, the lighting system has one or more probing holes at its exterior to enable electrical access to (e.g., electrical probing of) certain nodes within the lighting system's circuitry (e.g., light driver's circuitry). In some examples, the probing holes may be located at the top of the lighting system, which allow for operations of the lighting system to be electronically monitored (e.g., be troubleshot/debugged) even when the lighting system is connected to its intended fixture and is in normal operation.

As shown by FIGS. 14A and 14B, in the example of the lighting system 1-1, while the cap plate 718 may expose a number of probing holes 718*a* (see, e.g., FIG. 14A), removing the cap plate 718 to expose the top surface of the case cover 712 may reveal even more probing holes 718*a* (see, e.g., FIG. 14B) to allow for even better monitoring and troubleshooting of the lighting system 1-1. Similarly, in the example of the lighting system 1-4, while the assembled cap plate 1018 may expose a number of probing holes 1013 (see, e.g., FIG. 14C), removing the cap plate 1018 to expose the top surface of the case cover 1012 may reveal even more probing holes 1013 (see, e.g., FIG. 14D) to allow for even better monitoring and troubleshooting of the lighting system 1-4. In other words, a first probing hole of the plurality of probing holes 718*a*/1013 at the exterior of the housing may pass through both the cap plate 718/1018 and the case cover 712/812, and a second one of the plurality of holes passes only through the case cover 712/812 and not the cap plate 718/1018.

According to some examples, the lighting systems 1-1 to 1-4 may be configured to produce the following performance metrics:

| | 1st example configuration | 2nd example configuration |
|---|---|---|
| Case diameter (mm) | 50 | 65 |
| LES diameter (mm) | 19 | 32 |
| Lumens (lm) | 1300 | 2500 |
| CCT Range | 1800-6500K | 1800-6500K |
| Efficacy (lm/W) (@ 4000K) | 90 | 100 |

Figure 15C:
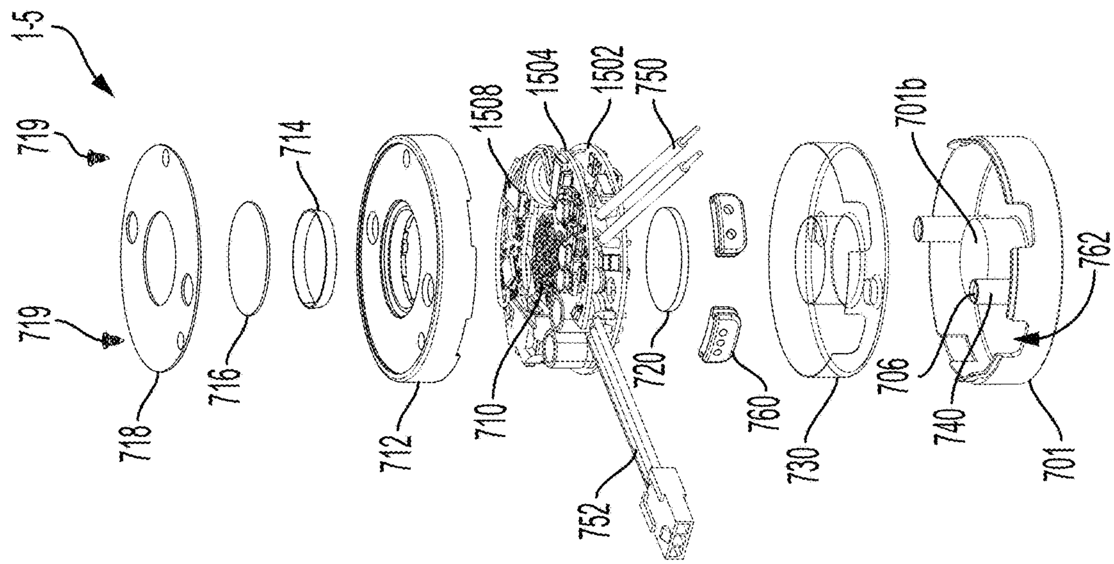
FIG. 15C illustrates an exploded perspective view of the lighting system, according to some embodiments of the present disclosure.
Figure 15A:
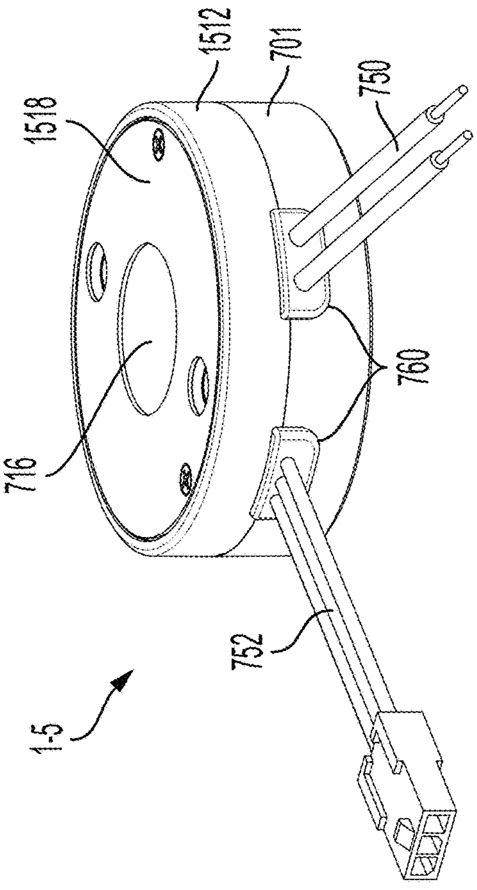
FIG. 15A illustrates a perspective view of the lighting system, according to some embodiments of the present disclosure.
Figure 15B:
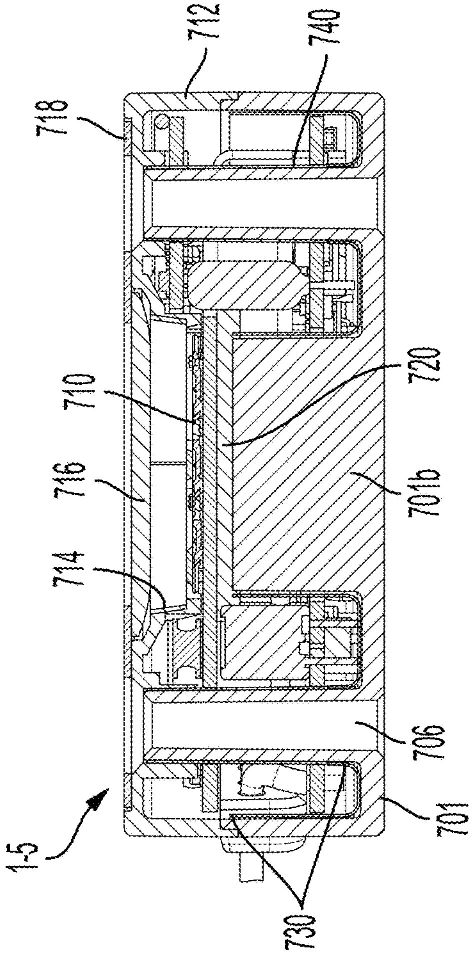
FIG. 15B illustrates a cross-sectional view of the lighting system, according to some embodiments of the present disclosure.

FIG. 15A illustrates a perspective view of the lighting system 1-5, according to some embodiments of the present disclosure. FIG. 15B illustrates a cross-sectional view of the lighting system 1-5, according to some embodiments of the present disclosure. FIG. 15C illustrates an exploded perspective view of the lighting system 1-5, according to some embodiments of the present disclosure.

Figure 16C:
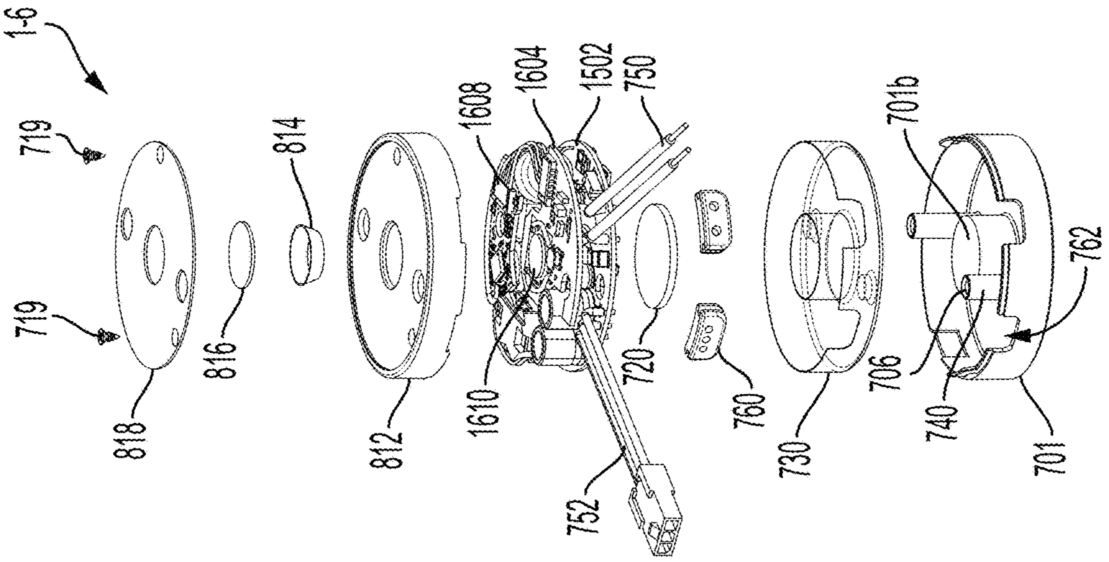
FIG. 16C illustrates an exploded perspective view of the lighting system, according to some embodiments of the present disclosure.
Figure 16A:
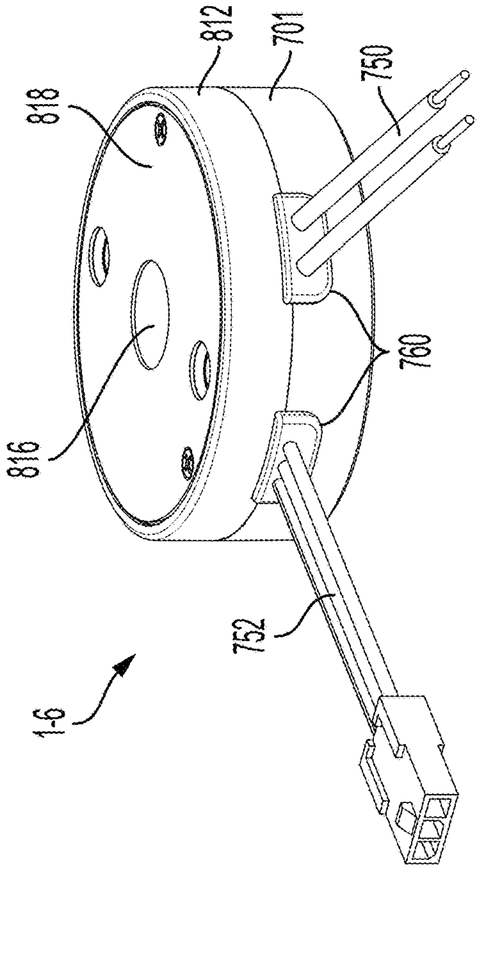
FIG. 16A illustrates a perspective view of the lighting system, according to some embodiments of the present disclosure.
Figure 16B:
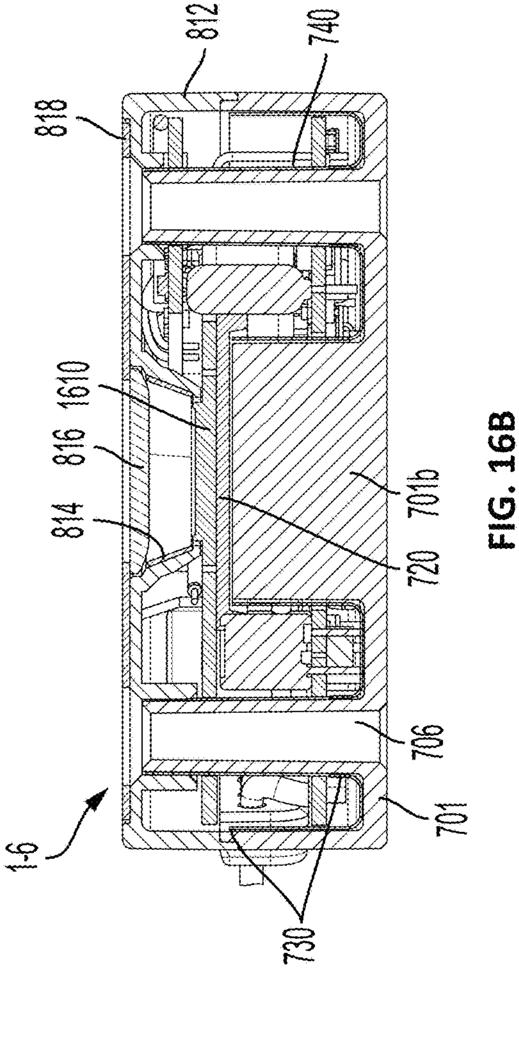
FIG. 16B illustrates a cross-sectional view of the lighting system, according to some embodiments of the present disclosure.

FIG. 16A illustrates a perspective view of the lighting system 1-6, according to some embodiments of the present disclosure. FIG. 16B illustrates a cross-sectional view of the lighting system 1-6, according to some embodiments of the present disclosure. FIG. 16C illustrates an exploded perspective view of the lighting system 1-6, according to some embodiments of the present disclosure.

Figure 17C:
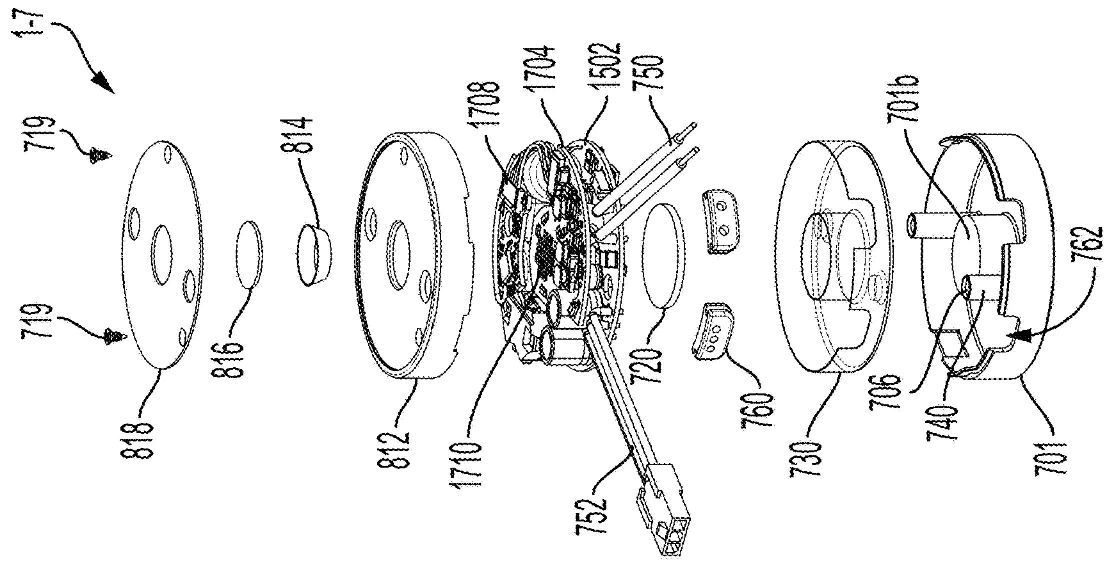
FIG. 17C illustrates an exploded perspective view of the lighting system, according to some embodiments of the present disclosure.
Figure 17A:
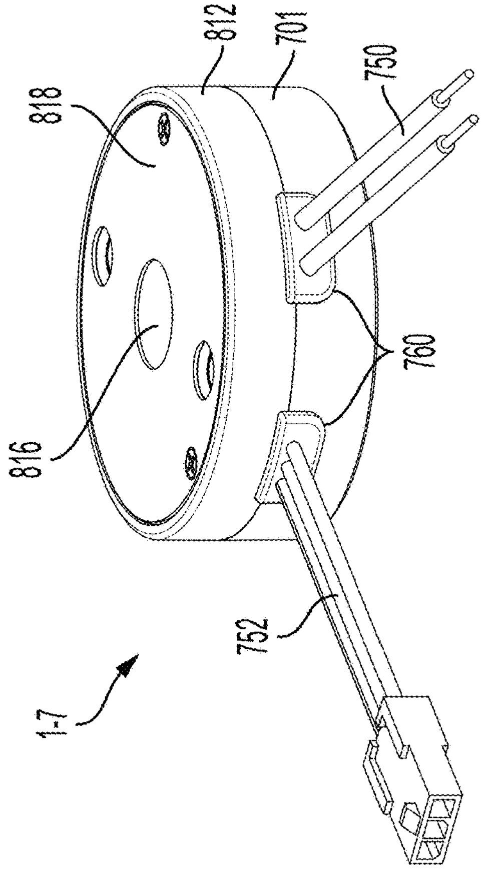
FIG. 17A illustrates a perspective view of the lighting system, according to some embodiments of the present disclosure.
Figure 17B:
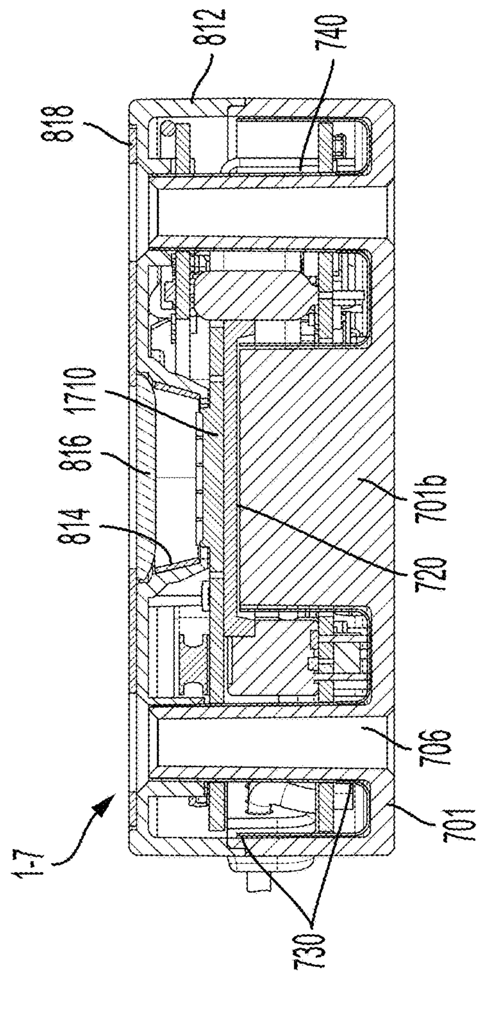
FIG. 17B illustrates a cross-sectional view of the lighting system, according to some embodiments of the present disclosure.

FIG. 17A illustrates a perspective view of the lighting system 1-7, according to some embodiments of the present disclosure. FIG. 17B illustrates a cross-sectional view of the lighting system 1-7, according to some embodiments of the present disclosure. FIG. 17C illustrates an exploded perspective view of the lighting system 1-7, according to some embodiments of the present disclosure.

Referring to FIGS. 15A-15C, the lighting system 1-5 is substantially similar to the lighting system 1-1, except for some differences between the first to third layers 1502, 1504, and 1508 of the lighting system 1-5 and the first to third layers 702, 704, and 708 of the lighting system 1-1, and a difference in manner in which the second and third layers 1504 and 1508 electrically connect to one another as compared to the second and third layers 704 and 708. These differences will be explained further with respect to FIGS. 18A-18C, 19A-19E, 20A-20E.

Referring to FIGS. 16A-16C, the lighting system 1-6 is substantially similar to the lighting system 1-1, except for the LEDs utilized, some differences between the first to third layers 1602, 1604, and 1608 of the lighting system 1-6 and the first to third layers 702, 704, and 708 of the lighting system 1-1, and a difference in manner in which the second and third layers 1604 and 1608 electrically connect to one another as compared to the second and third layers 704 and 708. These differences will be explained further with respect to FIGS. 18A-18C, 19A-19E, 20A-20Ek.

Referring to FIGS. 17A-17C, the lighting system 1-7 is substantially similar to the lighting system 1-1, except for the LEDs utilized, some differences between the first to third layers 1702, 1704, and 1708 of the lighting system 1-7 and the first to third layers 702, 704, and 708 of the lighting system 1-1, and a difference in manner in which the second and third layers 1704 and 1708 electrically connect to one another as compared to the second and third layers 704 and 708. These differences will be explained further with respect to FIGS. 18A-18C, 19A-19E, 20A-20E.

Referring to FIGS. 16A-16C and 17A-17C, the lighting systems 1-6 and 1-7 may utilize the same or substantially the same case cover 812, reflector 814, lens 816, and cap plate 818 of the lighting system 1-2.

Figure 18C:
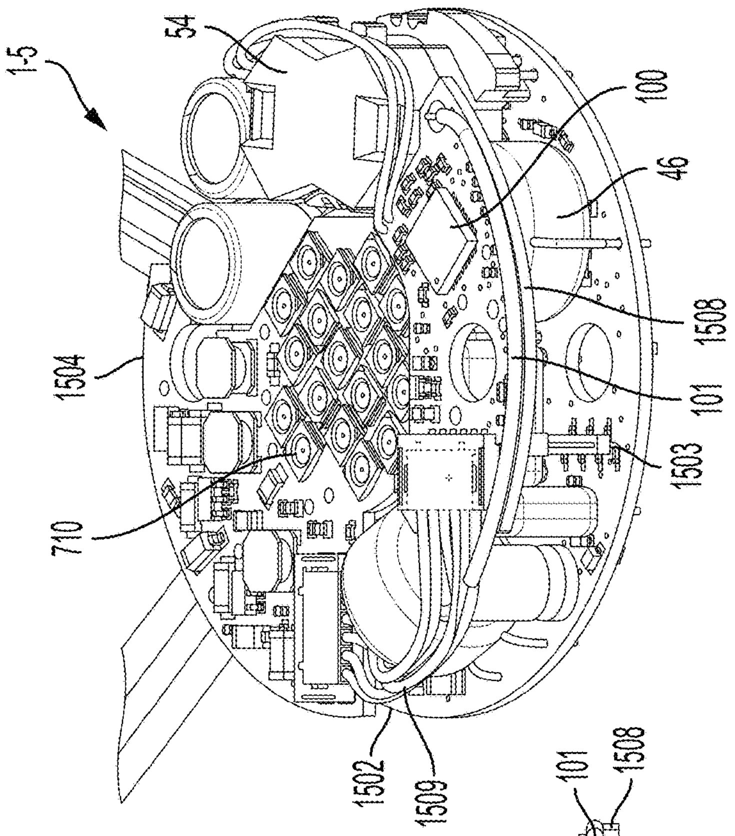
FIG. 18C illustrates a perspective view of the layers of the lighting system onto which the internal electrical components are mounted, according to some embodiments of the present disclosure.
Figure 18A:
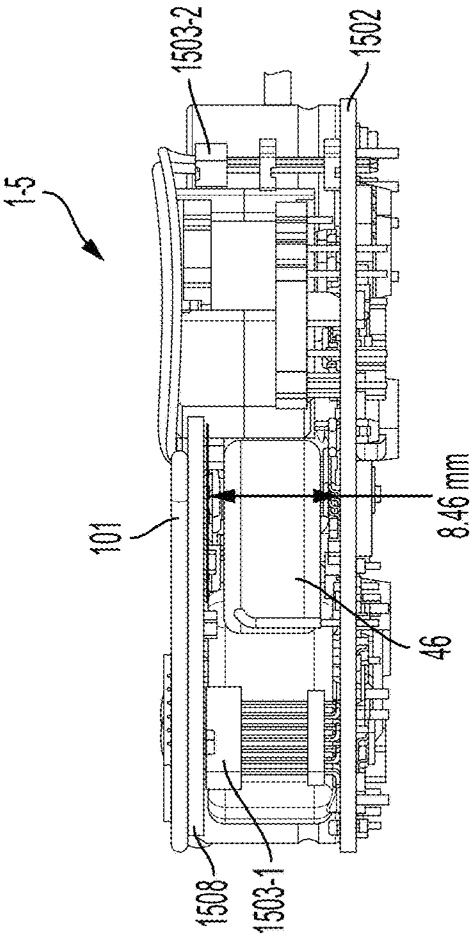
FIGS. 18A and 18B illustrate side views of the layers of the lighting system onto which the internal electrical components are mounted, according to some embodiments of the present disclosure.
Figure 18B:
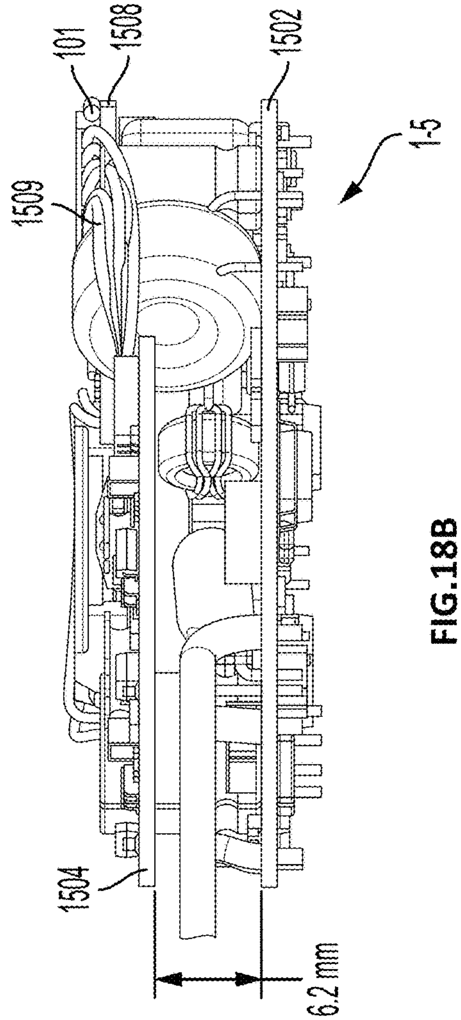
Figure 19A:
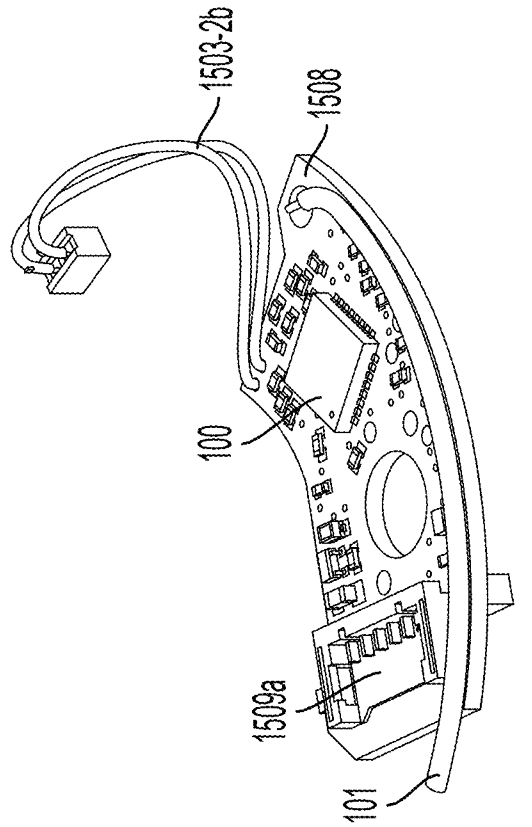
FIGS. 19A and 19B illustrate perspective topside and underside views, respectively, of the third layer 1508 of the lighting system, according to some embodiments of the present disclosure.
Figure 19B:
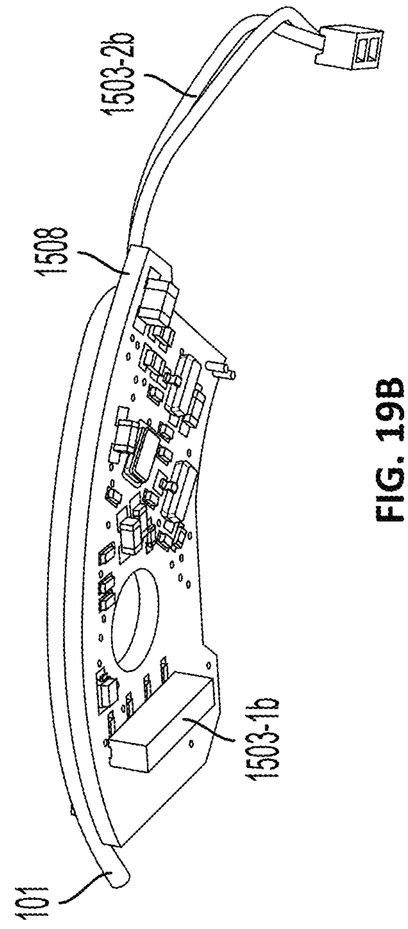
Figure 19E:
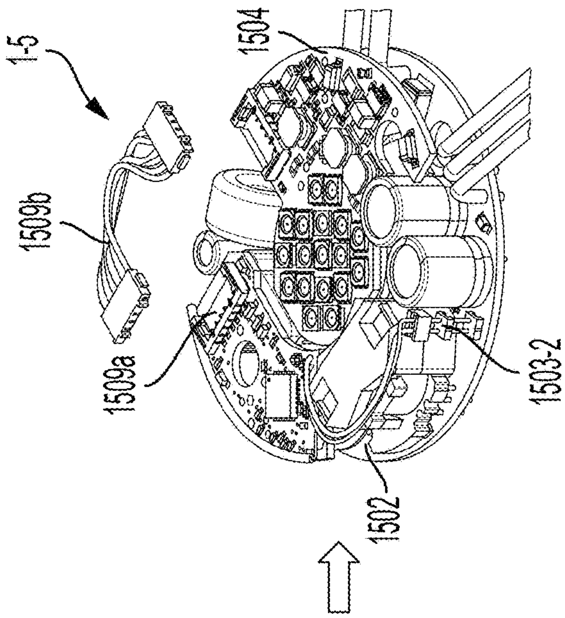
FIGS. 19C, 19D, and 19E are perspective views illustrating various stages of the assembly process of the first to third layers of the lighting system, according to some embodiments of the present disclosure.
Figure 19D:
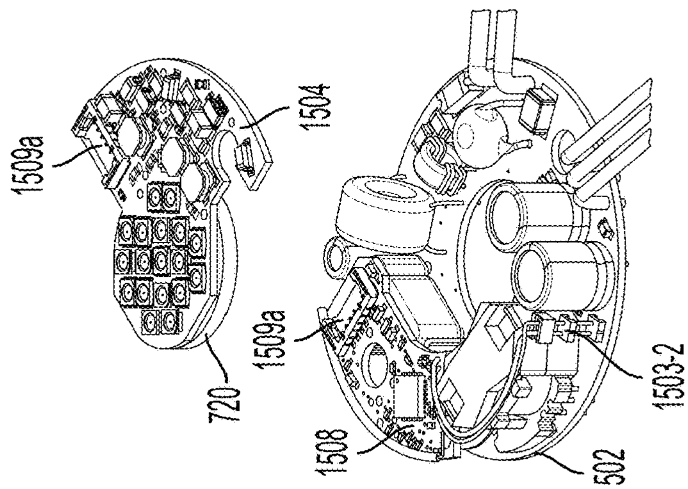
Figure 19C:
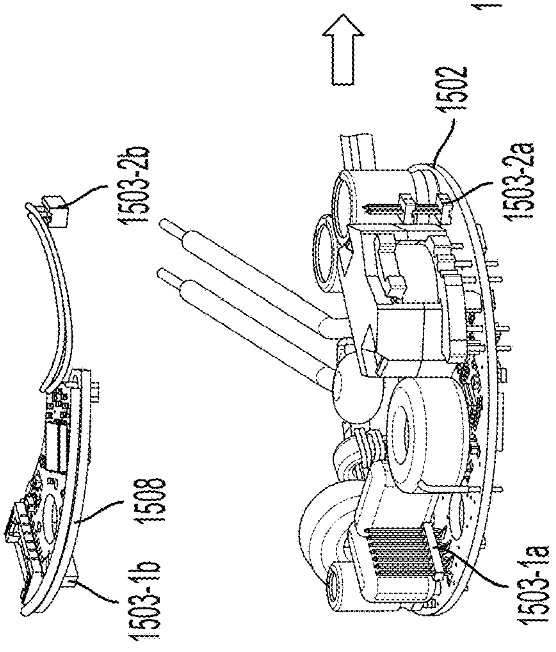

FIGS. 18A and 18B illustrate side views of the layers of the lighting system 1-5 onto which the internal electrical components are mounted, according to some embodiments of the present disclosure. FIG. 18C illustrates a perspective view of the layers of the lighting system 1-5 onto which the internal electrical components are mounted, according to some embodiments of the present disclosure. FIGS. 19A and 19B illustrate perspective topside and underside views, respectively, of the third layer 1508 of the lighting system 1-1, according to some embodiments of the present disclosure. FIGS. 19C, 19D, and 19E are perspective views illustrating various stages of the assembly process of the first to third layers 1502, 1504, and 1508 of the lighting system 1-5, according to some embodiments of the present disclosure.

Referring to FIGS. 18A-18B, in some embodiments, the first and second layers 1502 and 1504 may be vertically offset by about 6.2 mm, and the first and third layers 1502 and 1508 may be vertically offset by about 8.46 mm. In some examples, the second and third layers 1504 and 1508 may not overlap (or may have deminimus overlap) in a plan view.

Referring to FIGS. 18A-18C and 19A-19E, the electronic components of the first layer 1502 may be electrically coupled to those of the third layer 1508 via a first connector/link 1503-1 and a second connector/link 1503-2. In some examples, the male connectors (e.g., male terminals) 1503-1*a* and 1503-2*a* (of the first or third layers 1502 and 1508) may be connected to female connectors (e.g., female terminals) 1503-1*b* and 1503-2*b* (of the third or first layers 1508 and 1502).

The electrical components of the second and third layers 1504 and 1508 may be electrically coupled to one another via a third connector 1509. In some examples, the second and third layers 1504 and 1508 have sockets 1509*a* that are connected together via a plurality of wires 1509*b*.

Referring to FIGS. 19C-19E, in some examples, the layers 1502, 1504, and 1508 may be assembled by first connecting the first layer 1502 to the third layer 1508 via the first and second connectors 1503-1 and 1503-2, placing the gap thermal pad 1504 under the second layer 1504, positioning the thermal pad 720 and the second layer 1504 over the pedestal 701*b*, and electrically connecting the second and third layers 1504 and 1508 via the third connector 1509.

Figure 20C:
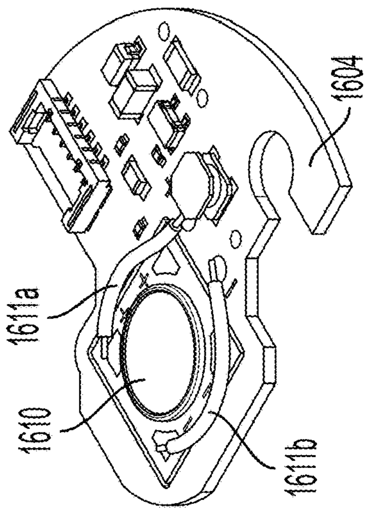
FIGS. 20A, 20B, and 20C respectively illustrate the second layers, according to some embodiments of the present disclosure.
Figure 20B:
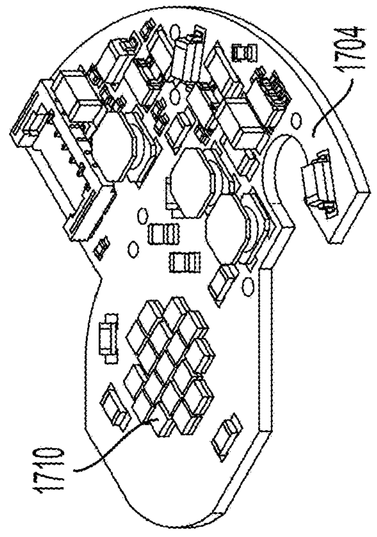
Figure 20A:
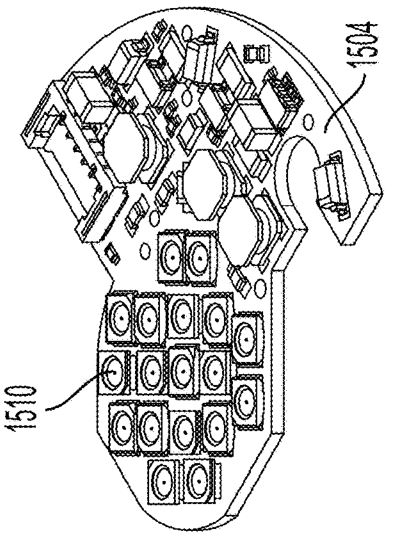
Figure 20E:
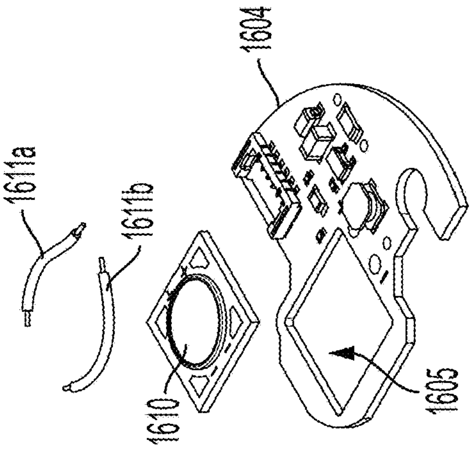
FIGS. 20D and 20E illustrate a top view and an exploded perspective view of the second layer, according to some embodiments of the present disclosure.
Figure 20D:
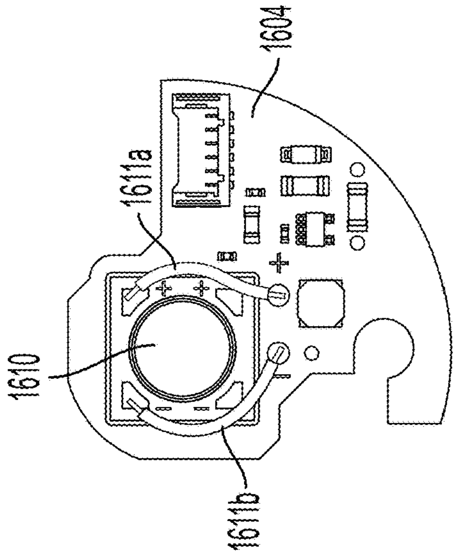

FIGS. 20A, 20B, and 20C respectively illustrate the second layers 1504, 1704, and 1064, according to some embodiments of the present disclosure. FIGS. 20D and 20E illustrate a top view and an exploded perspective view of the second layer 1604, according to some embodiments of the present disclosure.

Referring to FIGS. 20A-20E, the second layers 1604 and 1704 are substantially similar to the second layer 1504, except for the use of different LEDs. For example, the second layer 1604 utilizes a single a chip on board (COB) light (e.g., a single CCT COB) 1610 that may be placed in an opening 1605 in the second layer 1604. The COB light 1610 may be controlled by a single channel controller (as opposed to three or more channels of the lighting system 1-5 and 1-7). The COB light 1610 may be connected to the second layer 1604 via a power line 1611*a* and a ground line 1611*b*, which may be soldered to corresponding electrical pads/contacts on the second layer 1610. The power line 1611*a* and a ground line 1611*b* may be insulated to prevent the lines from touching the metal parts of the COB light 1610 and the PCB substrate.

As shown by the lighting systems 1-1 to 1-8, the design of the lighting system allows for the LEDs to be swapped out with any single color array, full-color array, COB, or any other suitable LED array. This change may be accomplished by using the same or substantially the same light engine and simply making suitable modifications to the channel controller firmware. This adds significant versatility to the design of the lighting system.

According to some examples, the lighting systems 1-5 to 1-7 may be configured to produce the following performance metrics:

| | 1st example configuration | 2nd example configuration | 3rd example configuration | 4th example configuration |
|---|---|---|---|---|
| Case diameter (mm) | 50 | 50 | 50 | 65 |
| LES diameter (mm) | 9, 12 | 19 | 9, 12 | 24, 32 |
| Lumens (lm) | 1300 | 1400 | 1400 | 2500 |
| CCT Range | 2200-5000K | 2700, 3000, 3500, 4000K | 2700, 3000, 3500, 4000K | static |
| Efficacy (lm/W) (@ 4000K) | 80 | 100 | 90 | 110 |

However, these are mere examples, and embodiments of the present disclosure are not limited thereto. For example, the lighting systems 1-1 to 1-7 may be configured to have any suitable performance metrics.

Figure 21C:
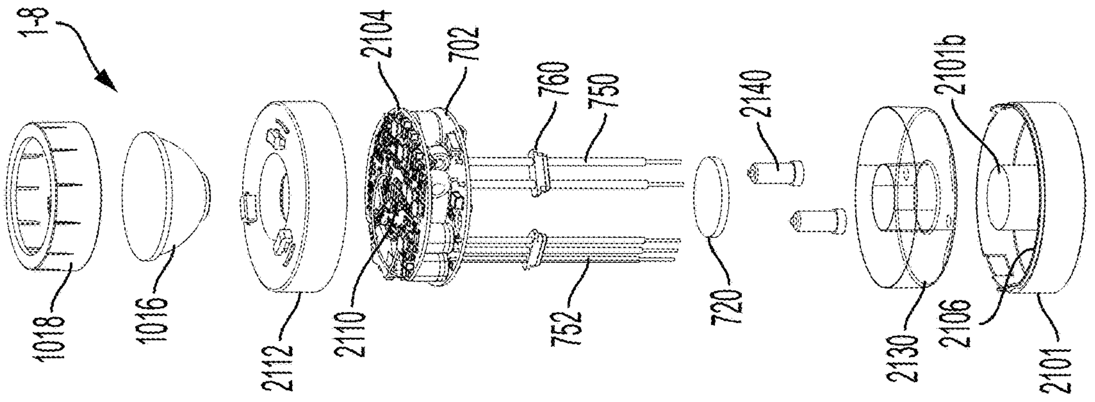
FIG. 21C illustrates an exploded perspective view of the lighting system, according to some embodiments of the present disclosure.
Figure 21B:
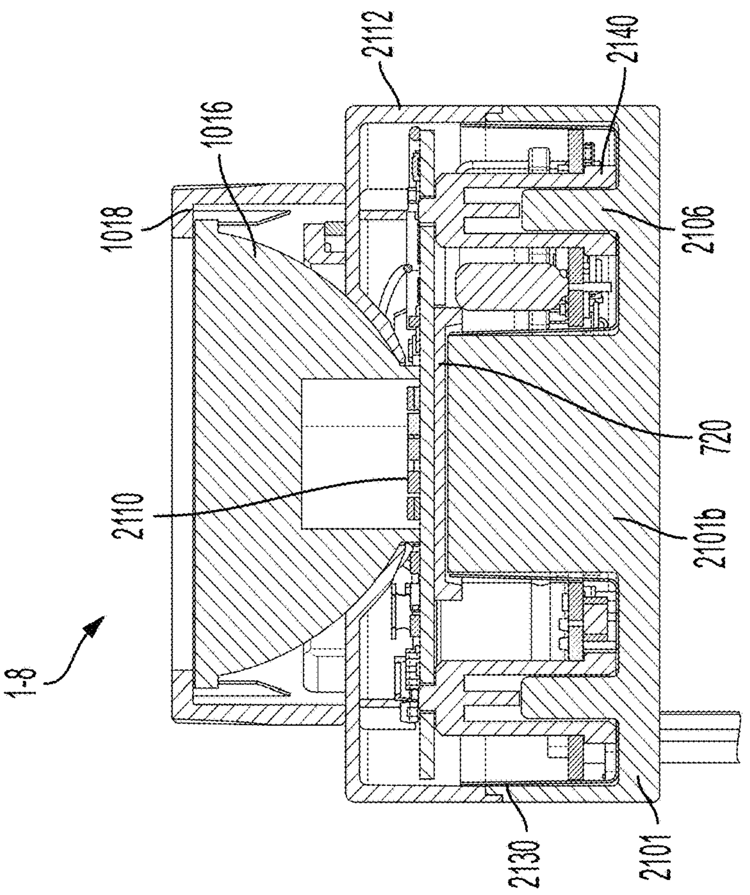
FIG. 21B illustrates a cross-sectional view of the lighting system, according to some embodiments of the present disclosure.
Figure 21A:
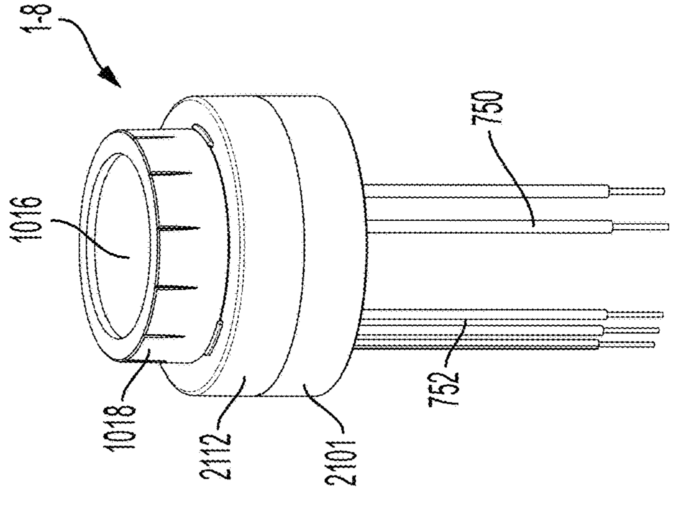
FIG. 21A illustrates a perspective view of the lighting system, according to some embodiments of the present disclosure.
Figure 22A:
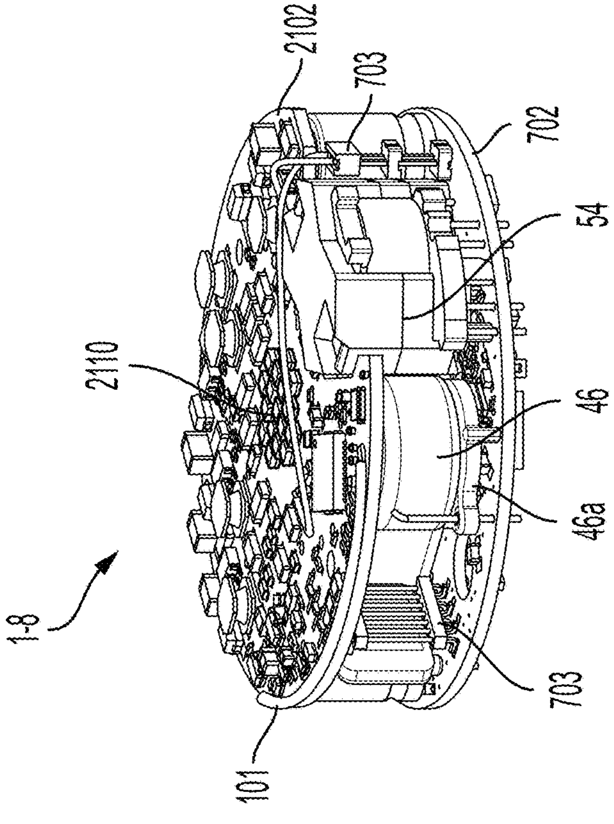
FIGS. 22A-22B illustrate a perspective view and an exploded perspective view of the first and second layers of the lighting system onto which some of the internal electrical components are mounted, according to some embodiments of the present disclosure.
Figure 22B:
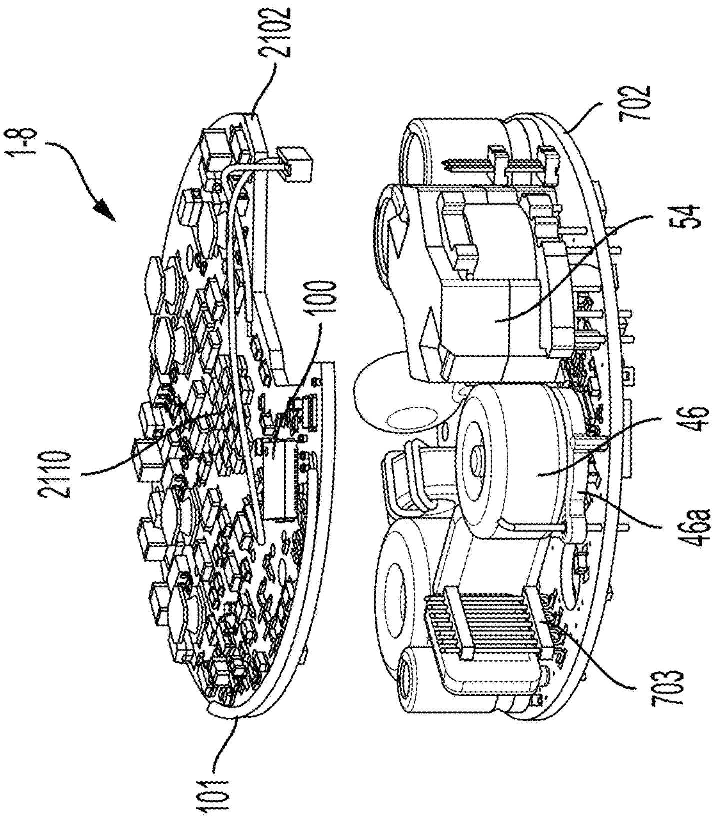

FIG. 21A illustrates a perspective view of the lighting system 1-8, according to some embodiments of the present disclosure. FIG. 21B illustrates a cross-sectional view of the lighting system 1-8, according to some embodiments of the present disclosure. FIG. 21C illustrates an exploded perspective view of the lighting system 1-8, according to some embodiments of the present disclosure. FIGS. 22A-22B illustrate a perspective view and an exploded perspective view of the first and second layers of the lighting system 1-8 onto which some of the internal electrical components are mounted, according to some embodiments of the present disclosure.

Here, the lighting system 1-8 is substantially similar to the lighting system 1-4 utilizing the TIR lens 1016. As such the following description primarily focuses on the differences between these embodiments, and a description of common elements will not be repeat herein.

Referring to FIGS. 21A-21C and 22A-22B, the lighting system 1-8 utilizes a 2-layer structure including the first layer 702 and a second layer 2104 that is essentially the integration of the second and third layers 704 and 708 of the lighting system 1-4. As a result of this integration, the vertical separation between the first and second layers 702 and 2102 of the lighting system 1-8 may be greater than that of the first and second layers 702 and 704 of the lighting system 1-4, for example. As such, the pedestal 2101*a* may be taller than the pedestal 701*b* of the lighting system 1-4. Similarly, the heatsink base 2101, the base insulator 2130, and the case cover 2112 of the lighting system 1-8 may have a taller profile than the heatsink base 701, the base insulator 730, and the case cover 712 of the lighting system 1-4. Further, while the base posts 2106 may be shorter than the base posts 706, the lighting system 1-8 may utilize 2140 insulator caps (instead of the roller insulators 740 of the lighting system 1-4) on top of the base posts 2106 to make up the height shortfall.

In some examples, the AC input lines 750 and the programming lines 752 may extend from the bottom of the lighting system 1-8, as opposed to its sides.

Furthermore, referring to FIGS. 22A-22B, the second layer 2102 utilizes 5 color channels to control the LEDs 2110, instead of the three used in the lighting system 1-4.

As shown in FIGS. 22A-22B, in some embodiments, to further improve vertical space utilization, one or more of the second components, such as the differential choke may be mounted to one side of an intermediary board (e.g., choke holder) 46*a*, which is fixed to and offset from the bottom surface of the first layer 702. This allows other components (e.g., small resistors and capacitors of, e.g., the active load 402) to be mounted at the other side of the intermediary board 46*a* thus resulting in even more space savings and thus achieving a higher part density within the confined packaging of the lighting system 1-8.

In some examples, the lighting system 1-8 may be implemented to have the following performance metrics:

| | 1st configuration | 2nd configuration | 3rd configuration |
|---|---|---|---|
| Case diameter (mm) | 50 | 50 | 65 |
| LES diameter (mm) | 9, 12 | 9, 12 | 20-32 |
| Lumens (lm) | 1200 | 1400 | 2000 |
| CCT Range | 1700-8000K | 1800-5000K | 1800-5000K |
| Efficacy (lm/W) (@ 4000K) | 65 | 80 | 80 |

However, these are mere examples, and embodiments of the present disclosure are not limited thereto. For example, the lighting system 1-8 may be configured to have any suitable performance metrics.

Figure 23D:
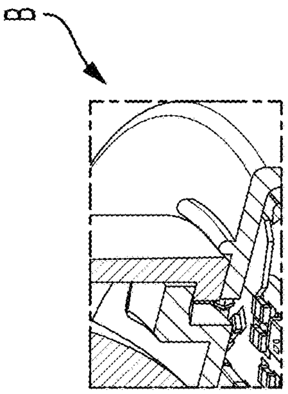
FIG. 23D illustrates a closer view of the area B of FIG. 23C, according to some embodiments of the present disclosure.
Figure 23B:
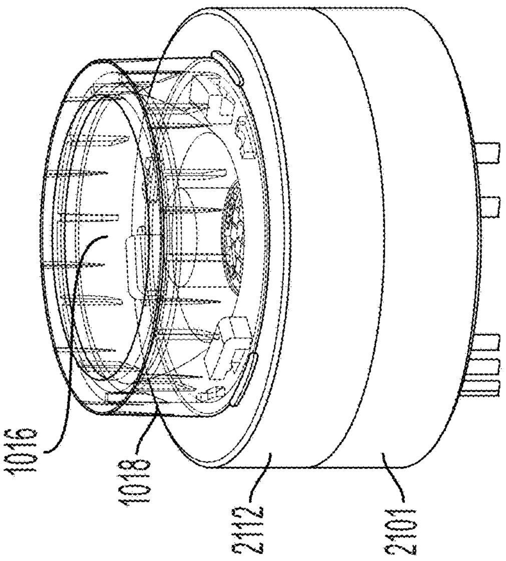
FIGS. 23A-23C illustrate the process of attaching the lens assembly of the lighting system, according to some embodiments of the present disclosure.
Figure 23C:
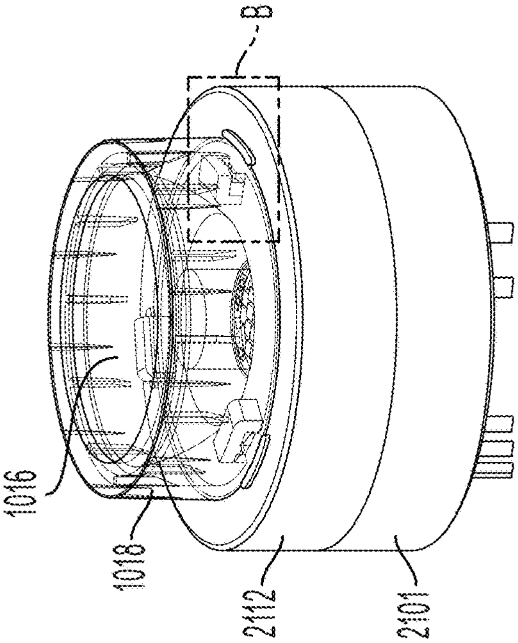
Figure 23A:
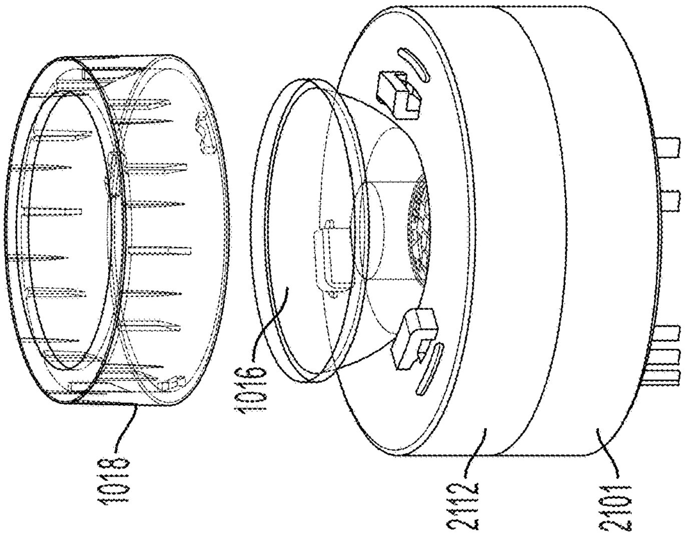

FIGS. 23A-23C illustrate the process of attaching the lens assembly of the lighting system 1-8, according to some embodiments of the present disclosure. FIG. 23D illustrates a closer view of the area B of FIG. 23C, according to some embodiments of the present disclosure.

In some examples, the lens assembly of the lighting system 1-8 may be attached by placing the lens (e.g., TIR lens) 106 within the opening of the case cover 2112, aligning the lens holder (e.g. twist-lock lens holder) 1018 to the TIR lens 1016, mounting the lens holder 1018 over the TIR lens 1016, and twisting the lens holder 1018 to engage lock with the case cover 2112.

In some embodiments, the lighting systems 1-1 to 1-8 are each capable of being securely mounted to a heatsink mount 2200 that can channel heat away from the lighting system to improve the lighting system's heat dissipation, thus preventing it from overheating and increasing its lifespan.

Figure 24C:
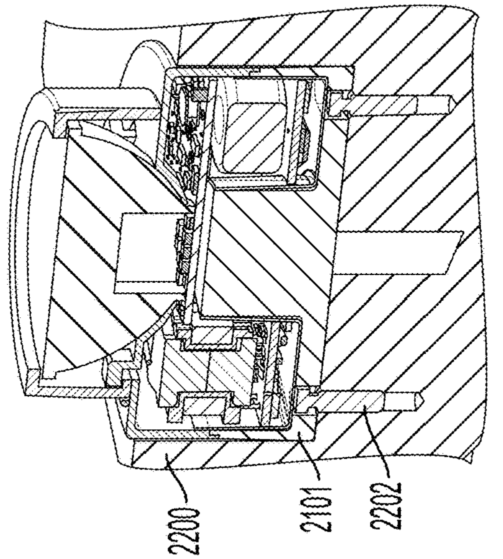
FIGS. 24C and 24D are cross-sectional view taken along the line A-A' of FIG. 24B that illustrate the lighting system as it is being attached to the heatsink mount, according to some embodiments of the present disclosure.
Figure 24D:
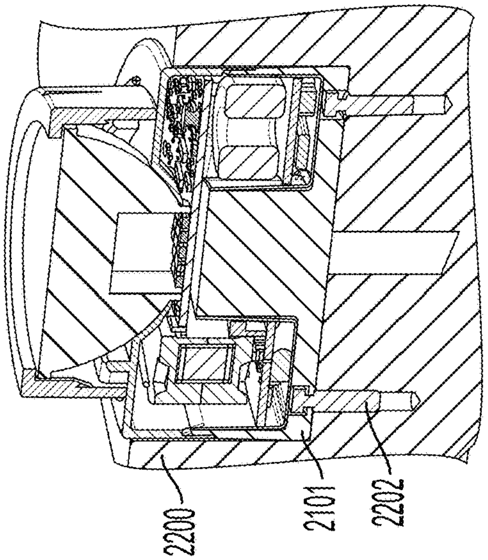
Figure 24B:
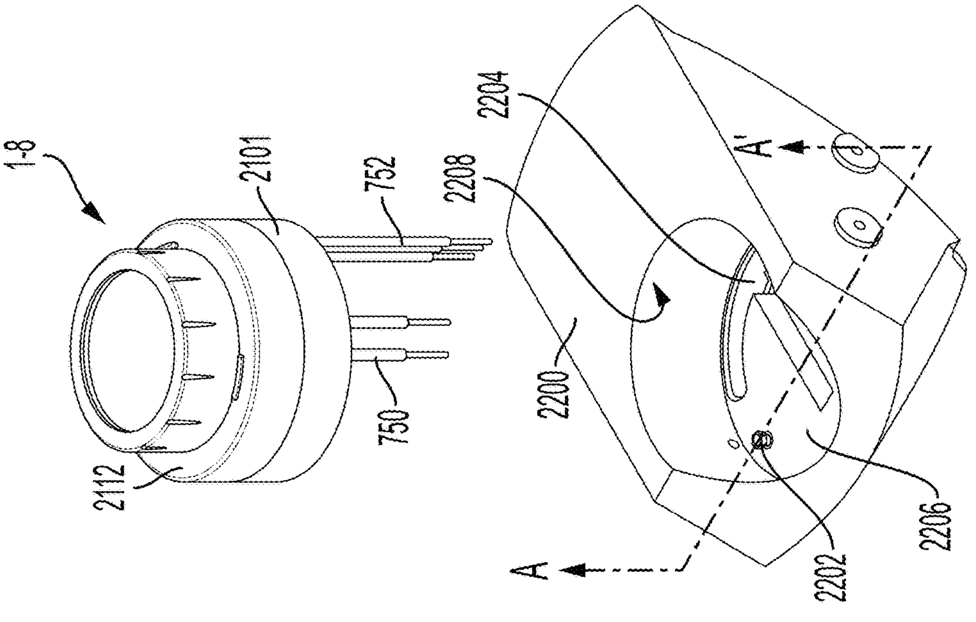
FIG. 24B illustrates an unmounted lighting system relative to a heatsink mount, according to some embodiments of the present disclosure.
Figure 24A:
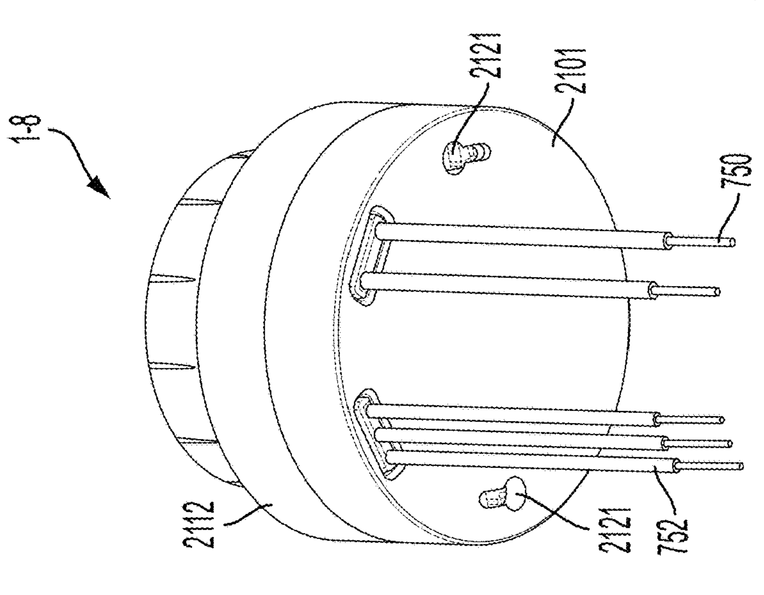
FIG. 24A illustrates a perspective view of the underside of the lighting system, according to some embodiments of the present disclosure.

FIG. 24A illustrates a perspective view of the underside of the lighting system 1-8, according to some embodiments of the present disclosure. FIG. 24B illustrates an unmounted lighting system 1-8 relative to a heatsink mount 2200, according to some embodiments of the present disclosure. FIGS. 24C and 24D are cross-sectional view taken along the line A-A' of FIG. 24B that illustrate the lighting system 1-8 as it is being attached to the heatsink mount 2200, according to some embodiments of the present disclosure. The lighting system 1-8 together with the heatsink mount 2200 form a light assembly.

As shown in FIGS. 24A-24B, the heatsink base 2101 has one or more mounting holes 2121 that can accommodate and mate with one or more male mounting protrusions 2202 of the heatsink mount 2200, however, embodiments of the present disclosure are not limited thereto. For example, the heatsink base 2101 may have one or more male mounting protrusions, which can mate with one or more mounting holes in the heatsink mount 2200. In some examples, the heatsink mount 2200 has an opening (e.g., an arcuate opening) 2204 that can accommodate the AC input lines (or AC input wires) 750 and the programming lines (or programming wires) 752 extending out of (e.g., penetrating) the bottom of the heatsink base 2101 (e.g., the bottom of the base plate). The AC input lines 750 carry the AC signal from the wall, and the programming lines 752 carry CCT and dimmer levels from a programming device that allow the lighting system 1-8 to adjust the CCT and intensity of the emitted light.

As shown in FIGS. 24B-24D, the lighting system 1-8 and heatsink mount 220 may be mounted by aligning the lighting system 1-8 with the depression of the heatsink mount 2200, inserting the lighting system 1-8 to align the male mounting protrusions 2202 with mounting holes 2121 (see, e.g., FIG. 24B), and twisting the lighting system 1-8 to engage the heatsink lock (see, e.g., FIGS. 24C-24D) and to secure the lighting system to the heatsink mount 2200.

As shown in FIG. 24D, once mounted, the bottom side of the heatsink base 2110 may be in close contact with the mounting surface 2206 of the heatsink mount 2200. As the heatsink mount is made of material with high thermal conductivity, such as copper and aluminum, the close contact enables the heatsink mount 2200 to effectively siphon heat away from the heatsink base 2101 of the lighting system 1-8. In some examples, the mounting surface 2206 is at the bottom of a depression within the heatsink mount 2200. In such examples, the inner sidewalls 2208 of the heatsink mount 2200 and the sidewalls of the heatsink base 2101 may also be in close proximity once mounted, which can further aid heat transfer.

While FIGS. 24A-24D illustrate the coupling of the lighting system 1-8 to heatsink mount 2200, this is merely an example, and any of the lighting systems 1-1 to 1-7, when modified to have the AC input lines and programming lines extend out of the back of the base plate of the heatsink base, may also be mounted to the heatsink mount 200 in the manner described above with respect to lighting system 1-8.

Accordingly, as described above, the multi-tiered design of the lighting system provides additional surface area to mount the various components of the light driver 30 in the vertical direction, which allows the lighting system to have a more compact design with a smaller footprint, as compared to designs of the related art.

According to some embodiments, the lighting system is a very high-density AC input light engines embedded with everything necessary to generate, control, and mount a fixture light source, according to some embodiments of the present disclosure. The total fixture cost may be lower than existing COB-based (or discrete LED) implementations, with more than 30% of the component count, processing steps & labor eliminated. The lighting system can be programmed to deliver any CCT from 1800K-6500K, eliminating the need to inventory specific COBs for every CCT point. The lighting system may provide up to 50 Watts in a compact 50 mm-65 mm diameter footprint. While some examples provide a full tunable white range of 1800K-6500K, single white, saturated color or circadian control configurations may also be implemented. Some embodiments of the lighting system provides high (1400) lumen density at 9 or 12 mm LES configurations in a 50 mm diameter aperture; however, the lumen output of the lighting system is fully programmable to match existing fixture breadth. The lighting system has a control interface that is fully compatible with DALI 2.0, 0-10V, DMX, Serial interface, BLE, and the like. The lighting system is programmable through a simple plug-in hand-held programmer or through ATE with internet of things (IOT) control. Further, the lighting system is fully field replaceable, similar to a light bulb, which drives warranty cost down for fixture manufacturers and allows low down time at end of life.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The integrated multi-layered lighting system and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A lighting system comprising:

a power supply configured to receive an AC input signal and to generate a rectified signal;

a light driver configured to generate a drive signal to drive a light source based on the rectified signal;

a housing configured to encapsulate the power supply and the light driver, the housing comprising a heatsink base forming a bottom portion of the housing and a case cover forming a top portion of the housing, the heatsink base being configured to channel heat away from the lighting system, the heatsink base comprising:

a base plate; and a pedestal structure protruding from the base plate toward the case cover; and a first layer vertically offset from the heatsink base by a base post of the heatsink base, the first layer comprising a first printed circuit board and having a first layer opening, wherein the pedestal structure passes through the first layer opening, and wherein one or more components of at least one of the power supply or the light driver are mounted on at least a top side of the first layer facing away from the base plate.

2. The lighting system of claim 1, wherein the heatsink base further comprises:

a base post configured to couple the base plate and the case cover; and base sidewalls extending from the base plate and configured to mate with cover sidewalls of the case cover.

3. The lighting system of claim 1, further comprising:

a second layer on the pedestal structure and vertically offset from the first layer by the base post, the second layer comprising a second printed circuit board, wherein the first and second layers overlap one another in a plan view, and wherein one or more components of at least one of the power supply or the light driver are mounted on at least a top side of the second layer facing away from the first layer.

4. The lighting system of claim 3, wherein components mounted on the second layer are electrically connected to components mounted on the first layer via an electrical connector.

5. The lighting system of claim 1, further comprising:

a second layer on the pedestal structure and comprising a second printed circuit board, wherein one or more components of at least one of the power supply or the light driver are mounted on at least a top side of the second layer facing away from the base plate of the heatsink base.

6. The lighting system of claim 5, further comprising:

a third layer on the second layer and partially overlapping the second layer in a plan view, wherein the third layer contacts a top surface of the second layer.

7. The lighting system of claim 6, wherein the second and third layers have overlapping openings to accommodate passage of a base post of the heatsink base therethrough.

8. The lighting system of claim 6, wherein components mounted on the third layer are electrically connected to components mounted on the second layer via a plurality of reflow connections at an interior edges of the third layer that connect to corresponding electrical pads on the second layer.

9. The lighting system of claim 6, wherein the light driver comprises:

a channel controller mounted on a top side of the third layer facing away from the heatsink base and configured to control regulation of light output of the light source; and an antenna electrically coupled to the channel controller and mounted to the third layer, at least a portion of the antenna extending along an outer edge of the third layer.

10. The lighting system of claim 9, wherein one or more components of the light driver are mounted on an under side of the third layer in a position overlapping the channel controller, and wherein the second layer has an opening corresponding to a location of the channel controller on the third layer to permit placement of the one or more components of the light driver that are mounted under the channel controller.

11. The lighting system of claim 1, wherein a light output of the light source has an intensity of 2000 lumens or less and a CCT of 1300K to 8000K, and wherein the housing has a substantially cylindrical shape with a diameter of 50 mm to 65 mm or less.

12. The lighting system of claim 1, wherein the housing has an opening through which light from the light source passes through to reach the outside, wherein the housing has an outer diameter of 50 mm, and the opening has an inner diameter of 9 mm to 12 mm, and wherein the light source comprises 3-channel desaturated light emitting diodes (LEDs) and is configured to generate a light of 1300 lm with a CCT from 2200K to 5000K.

13. The lighting system of claim 1, wherein the housing has an opening through which light from the light source passes through to reach the outside, wherein the housing has an outer diameter of 50 mm, and the opening has an inner diameter of 19 mm, and wherein the light source comprises 3-channel desaturated light emitting diodes (LEDs) and is configured to generate a light of 1400 lm with a CCT from 2700K to 4000K.

14. The lighting system of claim 1, wherein the housing has an opening through which light from the light source passes through to reach the outside, wherein the housing has an outer diameter of 50 mm, and the opening has an inner diameter of 9 mm to 12 mm, and wherein the light source comprises 3-channel desaturated light emitting diodes (LEDs) and is configured to generate a light of 1400 lm with a CCT from 2700K to 4000K.

15. A lighting system comprising:

a power supply configured to receive an AC input signal and to generate a rectified signal;

a light source that is configured to emit light based on a drive signal;

a light driver configured to generate the drive signal based on the rectified signal;

a housing configured to encapsulate the power supply and the light driver, the housing comprising a heatsink base forming a bottom portion of the housing and a case cover forming a top portion of the housing, the heatsink base being configured to channel heat away from the lighting system, the heatsink base comprising:

a base plate; and a pedestal structure protruding from the base plate toward the case cover; and a second layer on the pedestal structure and comprising a second printed circuit board, wherein the light source is mounted on the second layer in a position corresponding to the pedestal structure, and is thermally coupled to the pedestal structure.

* * * * *